US009679046B2

(12) United States Patent
Kaleta et al.

(10) Patent No.: US 9,679,046 B2
(45) Date of Patent: Jun. 13, 2017

(54) IDENTIFICATION AND QUANTIFICATION OF PREDATORY BEHAVIOR ACROSS COMMUNICATIONS SYSTEMS

(71) Applicant: Microsoft Technology Licensing, LLC, Redmond, WA (US)

(72) Inventors: Glenn Kaleta, Bothell, WA (US); Joe Louie, Shoreline, WA (US); Peter Daniell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 14/819,145

(22) Filed: Aug. 5, 2015

(65) Prior Publication Data

US 2017/0039274 A1   Feb. 9, 2017

(51) Int. Cl.
*G06F 17/27*   (2006.01)
*G06F 17/30*   (2006.01)

(52) U.S. Cl.
CPC ...... *G06F 17/30702* (2013.01); *G06F 17/279* (2013.01); *G06F 17/30616* (2013.01); *G06F 17/30634* (2013.01)

(58) Field of Classification Search
CPC ....... G06F 21/56; G06F 21/562; G06Q 30/06; H04L 29/06176; H04L 51/12
USPC .......... 704/9; 702/19; 706/45; 707/999.104, 707/999.107, E17.009, E17.044; 709/206; 726/6, 26; 713/170, 168; 715/758
See application file for complete search history.

(56) References Cited

U.S. PATENT DOCUMENTS

| 7,444,403 | B1 | 10/2008 | Packer et al. |
| 7,941,386 | B2 | 5/2011 | Bousquet et al. |
| 8,296,843 | B2 | 10/2012 | Myers et al. |
| 8,438,181 | B2 | 5/2013 | Read |
| 2008/0059198 | A1 | 3/2008 | Maislos et al. |
| 2012/0101970 | A1* | 4/2012 | Zernik ................ G06Q 10/10 706/45 |

OTHER PUBLICATIONS

Michalopoulos, et al., "A Method to Calculate Social Networking Hazard Probability in Definite Time", In Journal of Information and Computer Security, vol. 21, Issue 1, Apr. 13, 2015, 17 pages.

(Continued)

*Primary Examiner* — Charlotte M Baker
(74) *Attorney, Agent, or Firm* — Fiala & Weaver P.L.L.C.

(57) ABSTRACT

Methods, systems, apparatuses, and computer program products are provided that enable the identification of predatory behavior in communications systems. A plurality of textual messages of a message repository is queried with a plurality of sets of key phrases to determine and score textual messages that include one or more of the key phrases of the sets. Each scored textual message includes a suspect, a potential victim, and a score. Each suspect-to-potential victim pair corresponds to a conversation that includes the scored textual messages between the suspect and potential victim of the pair. A plurality of conversation risk scores is determined based at least on the scored textual messages. Each conversation risk score indicates an estimate of a risk of predatory behavior occurring during the corresponding conversation.

20 Claims, 9 Drawing Sheets

(56) References Cited

OTHER PUBLICATIONS

Vanderhoven, Ellen, "Changing Unsafe Behavior on Social Network Sites: Collaborative Learning vs. Individual Reflection", In Thesis of Doctor of Pedagogical Sciences, Jun. 2014, 249 pages.

Choo, Kim-Kwang Raymond, "Online Child Grooming: A Literature Review on the Misuse of Social Networking Sites for Grooming Children for Sexual Offences", In AIC Reports, Jul. 6, 2009, 132 pages.

"Immigration and Customs Enforcement Child Exploitation Tracking System", Published on: Jan. 19, 2010 Available at: <https://www.dhs.gov/xlibrary/assets/privacy/privacy_pia_ice_cets.pdf>, 20 pages.

Westlake, Bryce Garreth, "Analyzing Online Child Exploitation Networks: An Examination of Severity and Connectivity", In Master Thesis, Retrieved on: Apr. 13, 2015, 129 pages.

Hughes, et al., "Supporting Law Enforcement in Digital Communities through Natural Language Analysis", In Proceedings of 2nd International Workshop on Computational Forensics, Aug. 7, 2008, 2 pages.

Saul, et al., "Preventing Child Sexual Abuse Within Youth-serving Organizations: Getting Started on Policies and Procedures", Published on: Apr. 24, 2009, Available at: <http://www.cdc.gov/violenceprevention/pdf/PreventingChildSexualAbuse-a.pdf>, 55 pages.

"Data Mining Process", Published on: Feb. 11, 2012, Available at: <http://docs.oracle.com/html/B14339_01/5dmtasks.htm>, 4 pages.

\* cited by examiner

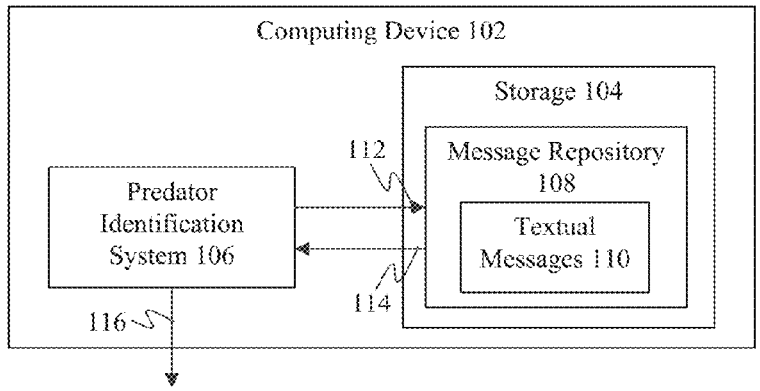

420

Generate a score for each textual message for each key phrase

Select a highest score for the scored textual messages of the corresponding conversation for each set of the plurality of sets of key phrases having a score to generate one or more highest scores

404

Discard the suspect-to-potential victim pair if the one or more highest scores includes fewer than a predetermined number of highest scores

406

Combine the one or more highest scores to generate an average suspect key phrases score

408

Multiply the average suspect key phrases score by a group count ID score to generate a suspect textual score

410

Generate an estimated age imbalance score

412

Modify the suspect textual score according to the estimated age imbalance score to generate a conversation risk score for the suspect-to-potential victim pair

FIG. 4B

IDENTIFICATION AND QUANTIFICATION OF PREDATORY BEHAVIOR ACROSS COMMUNICATIONS SYSTEMS

BACKGROUND

A variety of ways exist for persons to communicate with each other using textual messages, including text messages ("texting"), instant messages, emails, etc. In large scale open (unrestricted) and closed (restricted) systems that enable text-based interactions between users, the potential exists for some participants to target other members in undesirable manners, including harassment, threats, or predatory behavior. These types of interactions represent a clear risk to involved minors and could represent a legal and reputational risk to the entities that manage systems and services that support communications by textual messages.

Identifying this type of activity across a large-scale, global service or system that has tens of millions of members in an accurate manner is extremely challenging. Simple keyword searches of textual communications result in vast amounts of "false positives" and/or erroneous data that is extremely difficult to analyze successfully.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided that enable the identification of predatory behavior in communications systems. A plurality of textual messages of a message repository is queried with a plurality of sets of key phrases to determine and score textual messages that include one or more of the key phrases of the sets. Each scored textual message includes a suspect, a potential victim, and a score. Each suspect-to-potential victim pair corresponds to a conversation that includes the scored textual messages between the suspect and potential victim of the pair. A plurality of conversation risk scores is determined based at least on the scored textual messages. Each conversation risk score indicates an estimate of a risk of predatory behavior occurring during the corresponding conversation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1 shows a block diagram of a computer system configured to identify predatory behavior in textual communications, according to an example embodiment.

FIG. 2 shows a flowchart providing a process to identify predatory behavior in textual communications, according to an example embodiment.

FIG. 3 shows a block diagram of a predator identification system configured to identify predatory behavior in textual communications, according to an example embodiment.

FIG. 4A shows a process for scoring key phrases against a message repository, according to an example embodiment.

FIG. 4B shows a flowchart providing a process for determining a conversation risk, according to an example embodiment.

Figure 5:
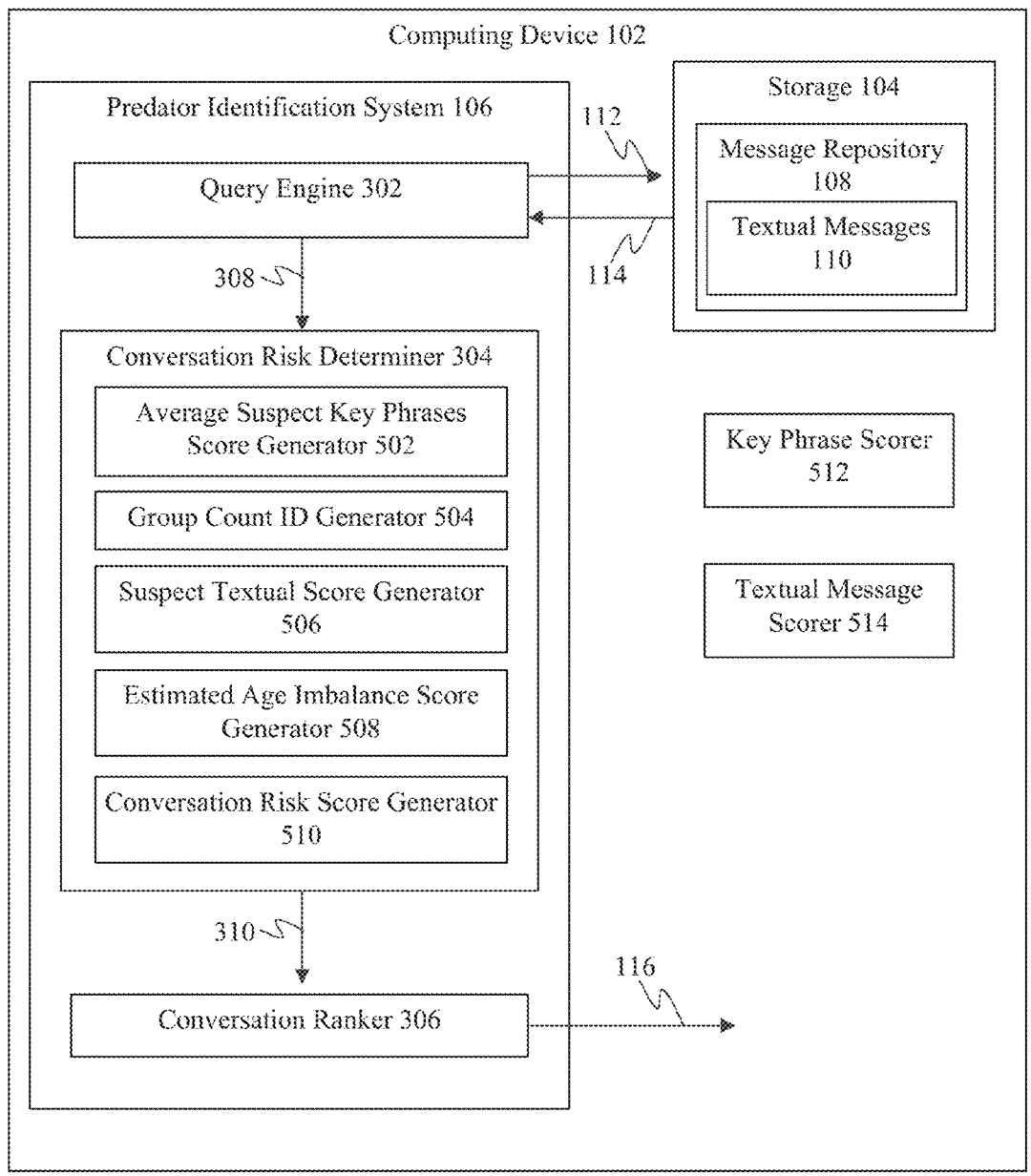
FIG. 5 shows a block diagram of a computing device that includes an example of the predator identification system of FIG. 3, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Identifying and Quantifying Predatory Behavior

A variety of ways exist for persons to communicate with each other using textual messages, including text messages ("texting"), instant messages, emails, etc. In large scale open (unrestricted) and closed (restricted) communication systems and services that enable text based interactions between users, the potential exists for participants to target other members in undesirable manners, including harassment, threats, or predatory behavior. Examples of such communication systems include email systems, instant messaging systems, text messaging systems, as well as social networks (e.g., Facebook® operated by Facebook, Inc. of Palo Alto, Calif., and Google+ operated by Google, Inc. of Mountain View, Calif.), video game system messaging networks (e.g., messaging enabled by Xbox® Live, operated by Microsoft Corporation of Redmond, Wash., and by Playstation®, operated by Sony Corporation of Toyko, Japan), and other networks enabling textual messaging. "Predatory behavior" refers to communications activity where adults identify and engage minors for the purposes of sexual exploitation. The process of such exploitation could include text based dialogue, the facilitation and eventual exchange of images (including illegal images of minors engaged in sexually related activity), and actual physical contact. These types of interactions represent an obvious risk to the involved minors and also represent a legal and reputational risk to the entities that manage systems that support textual message communications.

Identifying this type of activity across a large-scale, global service or system that has tens of millions of members in an accurate manner is extremely challenging. Simple keyword searches of textual communications result in vast amounts of "false positives" and/or erroneous data that is extremely difficult to analyze successfully. Intelligent and extensible techniques for identifying, quantifying, prioritizing, and notifying of these types of interactions for robust investigation and potential action would be useful.

Embodiments described herein dynamically interrogate high scale text based interactions between users of text based communications systems, and identify subjects engaging in predatory behavior that targets young and/or underage users. Embodiments analyze accessible data to return a scored and optionally ranked list of suspicious interactions, and the subjects who are involved in the interactions (e.g., the suspect and the potential victim). The returned data may be reviewed by an investigative team in order of priority, who may follow up with a proper procedural response if desired.

Accordingly, embodiments are disclosed that enable: identifying of the stages of predatory behavior; identifying key terms/phrases (alone or in conjunction with other terms) that are indicative of activity consistent with each of these stages; combining these data sets into a graduated, quantitative scoring system with a final product that assigns a level of risk to specific behavioral encounters across a large scale, global communications system; a specific weighting of terms and combination of terms within this algorithmic system; and techniques for exporting the final product/results.

Embodiments may be implemented in various ways. For instance, FIG. 1 shows a block diagram of a computer system 100 configured to identify predatory behavior in textual communications, according to an example embodiment. As shown in FIG. 1, computer system 100 includes a computing device 102, although additional computing devices may be optionally present. Computing device 102 includes storage 104 and a predator identification system 106. Storage 104 stores a message repository 108, which includes textual messages 110. Computer system 100 is further described as follows.

Storage 104 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Any number of textual messages may be included in textual messages 110, including hundreds, thousands, millions, and even greater numbers of textual messages. Examples of textual messages 110 include text messages, emails, instant messages, social network messages, video game network messages, etc. Textual messages 110 may include textual messages transmitted from any number of senders to any number of receivers.

Predator identification system 106 is configured to analyze textual messages 110 to identify predatory behavior. For example, by analyzing textual messages 110, predator identification system 106 may identify one or more suspects (persons that are potentially engaging in predatory behavior) and one or more victims (persons that are recipients of the predatory behavior). Predator identification system 106 may accomplish this by identifying and analyzing conversations between the suspects and victims that take place in the form of exchanges of textual messages.

Predator identification system 106 may be configured to perform such analysis and identification in various ways. For instance, FIG. 2 shows a flowchart 200 providing a process to identify predatory behavior in textual communications, according to an example embodiment. Predator identification system 106 may operate according to flowchart 200 in embodiments. Flowchart 200 is described as follows with reference to FIG. 1 and FIG. 3. FIG. 3 shows a block diagram of an example embodiment of predator identification system 106. As shown in FIG. 3, predator identification system 106 includes a query engine 302, a conversation risk determiner 304, and an optional conversation ranker 306. Each of these features of predator identification system 106 of FIG. 3 are described as follow.

Flowchart 200 of FIG. 2 begins with step 202. In step 202, a plurality of textual messages of a message repository is queried with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair. As shown in FIG. 1, predator identification system 106 may provide a query 112 to message repository 108 in storage 104. Storage 104 may be included with computing device 102, as shown in FIG. 1, or may be associated with a computing device that is separate from computing device 102 (e.g., coupled by a network).

FIG. 3 shows query engine 302 providing query 112. Query 112 includes a set of key phrases. Each key phrase is a textual string of one or more words, and is selected for inclusion in query 112 because its presence in a conversation is an indicator of a predatory conversation. Accordingly, query 112 is a query for textual messages in message repository 108 that include words (key phrases) that indicate predatory conversations.

In response to query 112, message repository 108 may provide one or more of textual messages 110 in a query response 114 to predator identification system 106, as shown in FIG. 1. For example, FIG. 3 shows query engine 302 receiving query response 114. Query response 114 includes some or all of textual messages 110, and may include each textual message in its entirety, or a portion thereof. For instance, in an embodiment, for each textual message, query response 114 may include indicate a sender, a receiver, the message text, and a score, described as follows.

A sender and receiver may be returned in query response 114 for each textual message. Each textual message of textual messages 110 includes a sender and a receiver, which are the two persons involved in the message exchange. One of the sender and receiver is the suspect and the other is the potential victim, depending who is sending and who is receiving the textual message. All textual messages in message repository 108 between a same suspect and potential victim are considered to be part of a same conversation relating to that particular suspect-to-potential victim pair, where the suspect is potentially engaging in predatory behavior with the potential victim. Accordingly, a conversation may be associated with and identified by all textual messages that are between the same corresponding conversation participants (the suspect and potential victim).

Message text is also returned in query response 114 for each textual message. The message text is the text written by the sender, and sent to the receiver, containing the information that the sender intended to be received by the receiver in the textual message.

Still further, a score is returned in query response for each textual message. The score indicates a plurality of key phrase scores, with one key phrase score corresponding to each key phrase applied in query 112.

Note that the key phrase scores may be generated at message repository 108 (FIG. 1), either (a) ahead of time (e.g., by pre-processing of textual messages 110 with a list of key phrases), or (b) after query 112 is received. Each key phrase score indicates an importance of the corresponding key phrase to the identification of predatory behavior. Collectively, the key phrase scores relating to a textual message between a suspect and potential victim indicate how likely the textual message is part of a predatory conversation between a predator and a victim.

As shown in FIG. 3, query engine 302 outputs scored textual messages 308, which includes the scored textual messages and related information received in query response 114 for all identified conversations.

Referring back to FIG. 2, in step 204, a plurality of conversation risk scores is determined based at least on the scored textual messages, each conversation risk score indicating an estimate of a risk of predatory behavior occurring during the corresponding conversation. In an embodiment, predatory identification system 106 is configured to determine a plurality of conversation risk scores corresponding to a plurality of conversations having textual messages included in textual messages 110. Each conversation risk score indicates a risk of the corresponding conversation being an actual predatory conversation between a predator and victim, such that the suspect in the conversation is an actual predator, and the potential victim is an actual victim.

For instance, as shown in FIG. 3, conversation risk determiner 304 receives scored textual messages 308 from query engine 302. Conversation risk determiner 304 is configured to analyze scored textual messages 308 to determine conversation risk scores for the conversations present in textual messages 110. Conversation risk determiner 304 may make this determination in any manner, and example techniques are described elsewhere herein. As shown in FIG. 3, conversation risk determiner 304 generates conversation risk scores 310.

For example, in an embodiment, for each conversation, recent interactions over a communications service between the two users (suspect and potential victim) may be analyzed by conversation risk determiner 304. Textual messages between the two users, and optionally further data, may be analyzed by conversation risk determiner 304 according to a multi-point risk system, to generate a conversation risk score for the conversation.

For example, in an embodiment, conversation risk determiner 304 may implement a five point risk system that analyzes the following five types of risks to generate conversation risk scores 310 for conversations between a suspect and potential victim:

(1) Suspect Risk—a determination of a risk that the suspect exhibits predatory behavior towards the potential victim (see suspect textual score described below; see seven key phrase sets described below for key phrases identifying the suspect's words);

(2) Victim Risk—a determination of a risk regarding the response of the potential victim to the suspect (the potential victim is engaging in the conversation; see seven key phrase sets described below for key phrases identifying the potential victim's words);

(3) Age-Disparity Risk—a determination of a likelihood that the suspect and potential victim are an adult and minor (see estimated age imbalance score described below; see confession key phrase set described below);

(4) Phrase-Association Risk—a determination of risk based on a contextual connection between the messages of the suspect with the potential victim (relates to a matching between key phrases of the suspect and potential victim to see if they make contextual connections, such as "what is your phone number" (suspect) and "here is my phone number (potential victim)); and (5) Metadata Risk—a determination of a risk based on conversation structure and non-conversational data (relates to multi-media messages, such as image files, voice messages, videos, links, etc.).

In embodiments, any one or more, or fewer of the above risk types (1)-(5), and/or one or more other risk types may be analyzed, to generate corresponding risk scores, which can be combined in any manner to generate a conversation risk score for each conversation. Each risk score may be determined in a variety of ways, examples of which are described further below. For example, a conversation risk score for a conversation may be calculated by the average of a highest score in every set of a plurality of predetermined sets of key phrases found in the conversation, multiplied by which sets are were found to have key phrases present in the conversation. A conversation that includes key phrases of greater numbers of key phrase sets in certain patterns are more likely to have a narrative structure similar to a predatory conversation.

In an embodiment, in order to improve the distinction of sexual conversations between consenting adults from predatory conversations, a modification of the conversation risk score for conversations may be made based on whether or not the potential victim has been identified as a minor. Because online "profile" data, such as birthdates, are not typically verified by the corresponding online service, and therefore are not completely reliable, and admission of underage status in a conversation is strong evidence in a predator investigation. Accordingly, in an embodiment, after a conversation has been identified between a suspect and potential victim, the textual messages of the conversation may be re-examined for evidence of the victim being a minor, and the conversation risk score may be correspondingly modified (e.g., increased if evidence is found that the victim is a minor, decreased if evidence is not found for the victim being a minor).

Referring back to FIG. 3, conversation ranker 306 is optionally present. When present, conversation ranker 306 receives and ranks conversation risk scores 310 in any manner, such as in a numerical order (e.g., highest risk score to lowest risk score), etc.

Predator identification system 106 of FIGS. 1 and 3 and flowchart 200 of FIG. 2 may operate in various ways to identify predatory behavior in a textual messages. For instance, FIG. 4A shows a step 420 for scoring key phrases against a message repository, according to an example embodiment. Step 202 of FIG. 2 may include step 420 in an embodiment, or step 420 may be performed prior to performance of step 202. FIG. 4B shows a flowchart 400 providing a process for determining a conversation risk, according to an example embodiment. Step 204 of FIG. 2 may operate according to flowchart 400 in an embodiment. Furthermore, FIG. 5 shows a block diagram of computing device 102 including an example of predator identification system 106 of FIG. 3, according to an embodiment. Example embodiments for flowchart 200, step 420, flowchart 400, and predator identification systems 106 of FIGS. 1, 3, and 5 are described in the following subsections.

A. Example Embodiments for Scoring Key Phrases and Textual Messages

As described above, predator identification system 106 may provide a query 112 to message repository 108 in storage 104. Query 112 is provided to return scored textual messages from message repository 108 that may be analyzed for the risk of predatory conversations between suspects and victims. The scored textual messages are returned in query response 114. Textual messages 110 may be scored according to the key phrases in various ways.

For instance, FIG. 4A shows a step 420 for scoring key phrases against a message repository, according to an example embodiment. Furthermore, FIG. 5 shows a block diagram of computing device 102 including an example of predator identification system 106 of FIG. 3, according to an embodiment. As shown in FIG. 5, predator identification system 106 includes query engine 302, conversation risk determiner 304, conversation ranker 306, a key phrase scorer 512, and a textual message scorer 514. In embodiments, and as described as follows, key phrase scorer 512 and textual message scorer 514 are configured to score key phrases against a message repository.

In step 420, a score is generated for each textual message for each key phrase. In an embodiment, one or more sets of key phrases may be included in query 112, by explicitly being listed in query 112, or by being referred to by query 112 (e.g., by an identifier), and each textual message of textual messages 110 may be scored for each key phrase. These scores may be generated in any suitable way, such as by key phrase scorer 512 and textual message scorer 514. In embodiments (as described above), the scores may be pre-generated, or may be generated after query 112 is provided, by key phrase scorer 512 and textual message scorer 514. Note that key phrase scorer 512 and textual message scorer 514 may be located in any suitable location, including being external to computing device 102, or included in computing device 102 as shown in FIG. 5. Key phrase scorer 512 and/or textual message scorer 514 may be included in message repository 108, in predator identification system 106, or elsewhere.

For example, in an embodiment, key phrases may be categorized into groups or sets, with each set including any number of one or more key phrases. Each key phrase set is a collection of key phrases with meanings that match a theme. These themes correspond to various goals of a suspect attempting to manipulate a victim verbally (through text). Each key phrase is included in a particular set based on how well the key phrase enables query 112 to identify these goals of the suspect, as well as how clearly the query results show evidence that the suspect has these goals.

In the embodiment described as follows, key phrases are categorized into seven sets, and each set includes approximately fifty key phrases. These example seven key phrase sets are listed as follows, along with a few illustrative key phrases:

(1) Vulnerability Identification: Includes key phrases that indicate the suspect is attempting to establish an age and/or situation of the potential victim, to determine the vulnerability of the victim as a potential target. Example key phrases that may be included in this key phrase set include: "How old are you," "are you alone," "where are your parents," "my age is."

(2) Relationship: Includes key phrases that indicate the suspect is attempting to build an attachment and a dependence with the potential victim, potentially trying to emotionally detach the potential victim from friends and family. Example key phrases that may be included in this key phrase set include: "Don't listen to," "they don't understand you," "I get you," "my parents don't understand me."

(3) Flirtation: Includes key phrases that indicate the suspect is directing the victim to sexual subjects, though the dialogue is not explicitly sexual yet. Example key phrases that may be included in this key phrase set include: "tickling," "cuddling."

(4) Confession: Includes key phrases that indicate the suspect to be admitting that their behavior is inappropriate, suspect is acknowledging relationship is inappropriate. Example key phrases that may be included in this key phrase set include: "You are underage," "I could go to jail."

(5) Sexual Exchange: Includes key phrases that provide direct sexual instruction and interaction, an online play of sexual interaction. Example key phrases that may be included in this key phrase set include: "Put your hand here," "touch yourself."

(6) Sexual Abstract: Includes key phrases that direct the conversation to sexual subjects, to discussing sexual hypotheticals, and the posing of sexual questions (more than mere flirtation). Example key phrases that may be included in this key phrase set include: "Are you a virgin," "have you had sex," "I have not had sex before."

(7) Isolation: Includes key phrases that indicate further contact is being attempted, including a physical meeting between the suspect and potential victim. Example key phrases that may be included in this key phrase set include: "My phone number is," "where do you live," "can we meet."

The above seven key phrase sets are listed as illustrative examples, and in other embodiments, additional, fewer, and/or alternative key phrase sets may be used. Each key phrase set may include key phrases that a suspect may use, and/or key phrases that a potential victim may use.

In an embodiment, each key phrase has its own score (e.g., a SQIP score, as described below) generated by key phrase scorer 512, which is weighted by one or more factors. In the embodiment described as follows, five factors are used to weight each key phrase score, although in other embodiments, other numbers of factors may be used. In an embodiment, each factor has a corresponding multiplier determined based on an importance of the key phrase's contribution to identification. These example factors are listed as follows:

(1) Subject: This factor weights a key phrase based on its relationship to one or more themes, such as age, complements, etc., indicating a representative threat level relative to other key phrases.

(2) Syntactical Quality This factor weights a key phrase base on a sentence structure of results.

(3) Contextual Quality: This factor weights a key phrase based on a context of results, indicating how often the key phrase is used in predatory conversations.

(4) Intensity: This factor weights a key phrase based on how well the meaning of the key phrase represents the subject of predatory dialogue.

(5) Prevalence: This factor weights a key phrase according to its commonness across all analyzed textual message, which may correspond to a threat level of the key phrase (e.g., a key phrase that is present in many textual messages may be considered less threatening, a key phrase that is present in few textual messages may be considered more threatening).

In an embodiment, the key phrases in all sets are each assigned a key phrase score by key phrase scorer 512. Each textual message is scored by textual message scorer 514 based on the scores of the key phrases that are present in the textual message, to generate a plurality of scored textual messages included in query response 114. Query response 114 indicates the sender, receiver, and score for each scored textual message.

Examples embodiments for generating a score for each key phrase, as may be performed by key phrase scorer 512 and/or in an embodiment of step 420 (FIG. 4A), are described in the following subsection.

1. Example Embodiments for a Textual Message Scorer

The sets of key phrases for messages associated with a possible suspect's predatory communications all have a corresponding score, which may be generated by key phrase scorer 512. In an embodiment, the score may be referred to as a "SQIP" (subject, quality, intensity, prevalence) score, when generated based on factors (1)-(5) listed above. In an embodiment, a queried textual message that has a positive return on any of the key phrases is assigned a score in a predetermined range, such as $8.13e-7$ to 100, based on the scores of those key phrases having positive scores. This score represents how effective the key phrases are to the identification process of a predatory conversation. The example range of $8.13e-7$ to 100 score results from the following example SQIP scoring system. Other scoring systems may have other score ranges. The SQIP system establishes how effective a key phrase is at determining predatory behavior, not just based on how contextually aggressive the key phrase is, but also taking into account a reliability that query results will indicate suspect behavior and not be a false-positive.

These four systems of SQIP scoring are described as follows:

(1) Subject: This relates to the subject factor described above (factor (1)), and refers to the topic of discussion and a theoretical intent of the suspect when making a statement containing the key phrase, such as guardian location, sexual instruction, etc.

(2) Quality: This relates to the syntactical and contextual quality factors described above (factors (2) and (3). Together, these measures are a combined assessment of the meaning of key phrase messages by users on an online service, and how likely that meaning may indicate suspicious behavior. Conversations of pairings between users who have at least two query set results are examined. From this set of messages, each key phrase is scored by how accurately its results will be a text message that matches a targeted message for predatory identification. These two quality factors may be evaluated as follows:

Syntactical Quality: Does the key phrase query return a message with a sentence structure matching the targeted structure of the key phrase?

Contextual Quality: Do messages with matching sentence structure have the same context as the targeted meaning of the key phrase?

As an example, the following key phrase may be included in query 112: "When you get older." This key phrase may be used in different ways, which may or may not have syntactical and/or contextual quality relevance. When used in a textual message in this manner, "when you get older, you will start dating," the key phrase "when you get older" has both syntactical and contextual quality. This is because, syntactically, the key phrase is used in a sentence structure targeted to a statement about the age of the possible victim, and contextually, the key phrase is used in the context of discussing the victim's age in a predatory context.

However, when used in a textual message in this manner, "when you get older flour, the dough tastes bad," the key phrase "when you get older" does not have either of syntactical or contextual quality. This is because, syntactically, the key phrase is not used in a sentence structure targeted to a statement about the age of the possible victim (instead relates to the age of flour), and contextually, the key phrase is not used in the context of discussing the victim's age in a predatory context.

Still further, when used in a textual message in this manner, "when you get older, you will eat kale," the key phrase "when you get older" has syntactical quality, but not contextual quality. This is because, syntactically, the key phrase is used in a sentence structure targeted to a statement about the age of the possible victim, but contextually, the key phrase is not used in the context of discussing the victim's age in a predatory context (instead relates to a context of the vegetable kale).

(3) Contextual Intensity: This relates to the connection between a key phrase's quality and subject. This score establishes how well the targeted meaning of the key phrase represents the purpose of the subject.

(4) Prevalence: This relates to the frequency of usage for a key phrase across messaging repository 108. For instance, a level of key phrase commonness in an online service may be compared with the subject measure (1) to determine a final prevalence score.

In an embodiment, for key phrase scorer 512 to establish a SQIP score for each key phrase of the key phrase sets, all of the key phrases are ranked by how well each key phrase performs in each SQIP category. Such a ranking may be performed manually or automatically by key phrase scorer 512. The highest number in each ranking represents the most complete representation of the evaluation. For example, in an embodiment, each key phrase may receive a ranking in the range of 1 to 7 for each of the first four SQIP systems of Subject, Syntactical Quality, Contextual Quality, and Contextual Intensity. Furthermore, with respect to the fifth SQIP system of Prevalence, each key phrase may be ranked in the range of 1 to 10 based on a count of the number of textual messages found to include the key phrase. For instance, each ranking point from 1 to 10 may represent a range of counted messages, such as shown in Table 1 below:

TABLE 1

| Count of Messages | Prevalence Rank |
| --- | --- |
| 0-10 | 1 |
| 11-50 | 2 |
| 51-100 | 3 |
| 101-250 | 4 |
| 251-500 | 5 |
| 501-750 | 6 |
| 751-1,000 | 7 |
| 1,001-2,000 | 8 |
| 2,001-5,000 | 9 |
| 5,001+ | 10 |

Based on the key phrase rankings, the key phrases are each assigned a score for each SQIP system, such as described as follows:

(1) Subject: In an embodiment, the Subject factor is considered to have the highest level of importance in the SQIP calculations. In such an embodiment, Subject may have the largest possible score, which may follow an exponential (or other) model in order to separate key phrases that are the most indicative of a suspect's attempt to engage in predatory conversation. For instance, Table 2 below shows the Subject ranking values of 1 to 7, each with a corresponding Subject score:

TABLE 2

| | Subject Rank | | | | | | |
| --- | --- | --- | --- | --- | --- | --- | --- |
| | 1 | 2 | 3 | 4 | 5 | 6 | 7 |
| Subject Score | 0.5 | 1 | 2 | 4 | 8 | 64 | 128 |

In this example, higher Subject ranking values lead to increasingly higher Subject scores.

Figure 6:
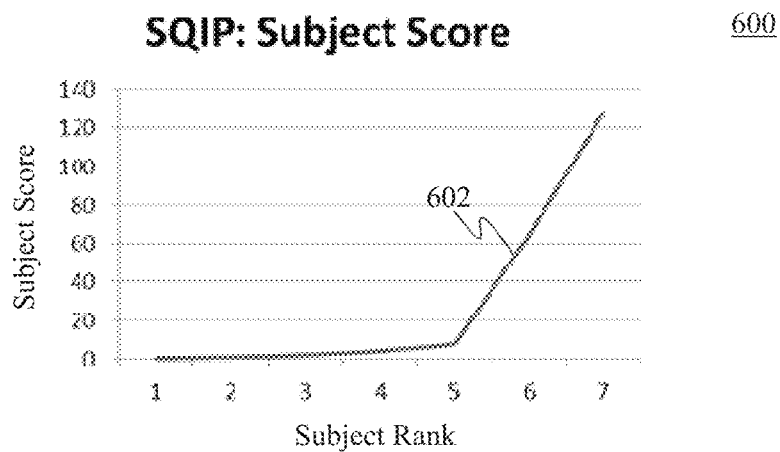
FIG. 6 shows a graph showing a plot of a SQIP (subject, quality, contextual intensity, prevalence) subject score, according to an embodiment.

In another example, FIG. 6 shows a graph 600 showing a plot 602 of a SQIP (subject, quality, contextual intensity, prevalence) subject score, according to an embodiment. As shown in FIG. 6, plot 602 is a line that indicates a gradual increase in subject score as subject rank increases from 1 to 5, and a relatively sharp increase in subject score as subject rank increases from 5 to 7.

(2) Quality: In an embodiment, the Quality SQIP score may be scored using an algebraic model with any relative weighting for the Syntactical Quality and Contextual Quality rankings, including different or equal weights for Syntactical Quality and Contextual Quality. For example, the two rankings may be multiplied together to produce a Quality Score in the range of 1 to 49 (when the rankings each have values in the range of 1 to 7).

(3) Contextual Intensity: In embodiments, the Contextual Intensity SQIP score may be scored in any manner, including using a formulaic model that provides for separation between the top and lower two rank values. For instance, Table 3 below shows the Intensity ranking values of 1 to 7, each with a corresponding Intensity score:

TABLE 3

| | Intensity Rank | | | | | | |
| --- | --- | --- | --- | --- | --- | --- | --- |
| | 1 | 2 | 3 | 4 | 5 | 6 | 7 |
| Intensity Score | 1 | 2.625 | 4.25 | 7.5 | 10.75 | 12.375 | 14 |

In this example, as Intensity rank increases, Intensity score increases similarly, with a slight deviation from a pure linear increase.

Figure 7:
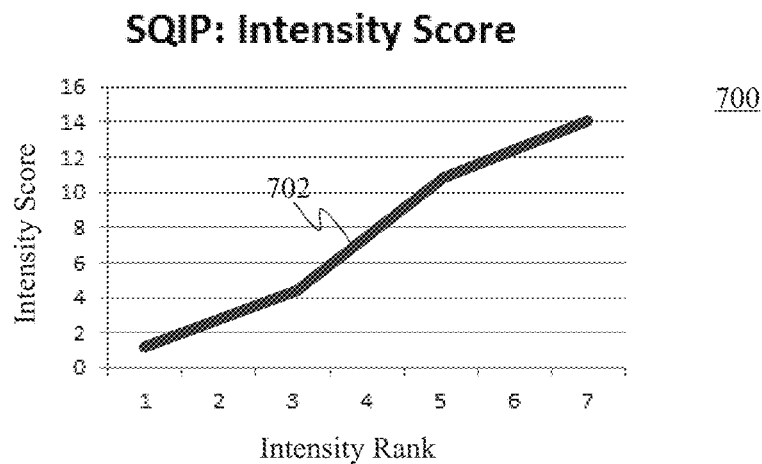
FIG. 7 shows a graph showing a plot of a SQIP intensity score, according to an embodiment.

In another example, FIG. 7 shows a graph 700 showing a plot 702 of a SQIP intensity score, according to an embodiment. As shown in FIG. 7, plot 702 is a line that indicates a relatively linear increase in Intensity score with increasing Intensity rank, with segments of linear increase in Intensity score for Intensity ranks from 1 to 3, from 3 to 5, and from 5 to 7.

(4) Prevalence: In embodiments, the Prevalence SQIP score may be scored in any manner, including by comparing the Prevalence ranking with the Subject ranking. Such a scoring configuration scores the key phrase not only by its commonness, but also by its commonness as a high or low indicator of evidence. Key phrases with rare usage in a messaging service are given higher scoring, although this is capped by the Subject ranking such that a common but top-ranked Subject key phrase is still scored higher than a rare but low-ranked Subject key phrase. For instance, Table 4 below shows the Subject ranking values of 1 to 7, Prevalence ranking values of 1 to 10, and corresponding Prevalence scores on a third axis having values in the range of 1 to 7:

TABLE 4

| Prevalence Rank | Subject Rank | | | | | | |
| --- | --- | --- | --- | --- | --- | --- | --- |
| | 1 | 2 | 3 | 4 | 5 | 6 | 7 |
| 1 | 3 | 3.5 | 4 | 5 | 6 | 6.5 | 7 |
| 2 | 2.75 | 3.25 | 3.75 | 4.75 | 5.75 | 6.25 | 6.75 |
| 3 | 2.5 | 3 | 3.5 | 4.5 | 5.5 | 6 | 6.5 |
| 4 | 2 | 2.5 | 3 | 4 | 5 | 5.5 | 6 |
| 5 | 1.83 | 2.33 | 2.83 | 3.83 | 4.83 | 5.33 | 5.83 |
| 6 | 1.67 | 2.17 | 2.67 | 3.67 | 4.67 | 5.17 | 5.67 |

TABLE 4-continued

| Prevalence | Subject Rank | | | | | | |
|---|---|---|---|---|---|---|---|
| Rank | 1 | 2 | 3 | 4 | 5 | 6 | 7 |
| 7 | 1.5 | 2 | 2.5 | 3.5 | 4.5 | 5 | 5.5 |
| 8 | 1.33 | 1.83 | 2.33 | 3.33 | 4.33 | 4.83 | 5.33 |
| 9 | 1.17 | 1.67 | 2.17 | 3.17 | 4.17 | 4.67 | 5.17 |
| 10 | 1 | 1.5 | 2 | 3 | 4 | 4.5 | 5 |

In this example, Prevalence score increases as Subject rank increases, but decreases as Prevalence rank increases.

Figure 8:
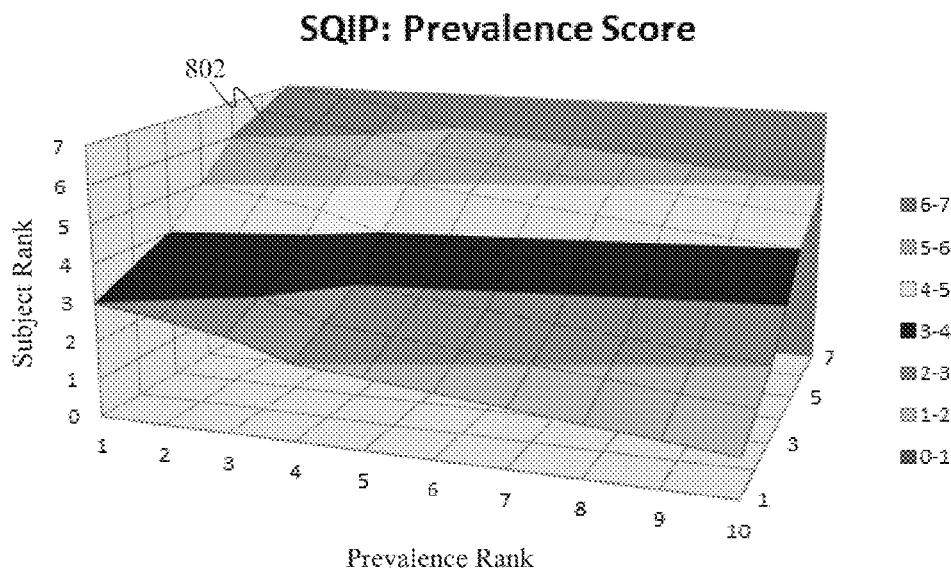
FIG. 8 shows a graph showing a plot of a SQIP prevalence score, according to an embodiment.

FIG. 8 shows a graph 800 showing a plot 802 of a SQIP prevalence score, according to an embodiment. As shown in FIG. 8, plot 802 is two-dimensional shape representing Prevalence score. Subject ranking values of 1 to 7 are shown on a first axis, Prevalence ranking values of 1 to 10 are shown on a second axis, and corresponding Prevalence scores are shown on a third axis having values in the range of 1 to 7: Similarly to Table 4, Prevalence score increases as Subject rank increases, but decreases as Prevalence rank increases As described above, the separate Subject, Quality, Intensity, and Prevalence system scores may be combined by key phrase scorer 512 to generate a SQIP score for a key phrase. The separate scores may be combined in any manner. For instance, in an embodiment, the four scores may be multiplied together, divided by the maximum possible score, and multiplied by 100 in order to establish a SQIP Score. Minimum and maximum separate scores are combined below to show resulting minimum and maximum scores for this example SQIP score calculation technique:

$$\text{Subject Score} \quad \text{Quality Score} \quad \overset{\text{Contextual}}{\text{Intensity Score}} \quad \text{Prevalence Score} \quad \text{Maximum Score}$$
$$(((0.5 - 128) \times (1 - 49) \times (1 - 14) \times (1 - 7)) / 614{,}656) \times 100 =$$

SQIP Score in range of 8.13 $e$-7 to 100.

Table 5 below shows example Subject, Syntactical Quality, Contextual Quality, Intensity, and Prevalence system rankings for the example key phrase "Do not tell your parents", and Table 6 shows example Subject, Quality, Intensity, and Prevalence system scores generated based on the rankings in Table 5, and a resulting SQIP score:

TABLE 5

| | |
|---|---|
| Subject Rank | 5 |
| Syntactical Quality Rank | 5 |
| Contextual Quality Rank | 5 |
| Contextual Intensity Rank | 7 |
| Prevalence Rank | 1 |

TABLE 6

| | |
|---|---|
| Subject Score | 8 |
| Quality Score | 25 |
| Intensity Score | 14 |
| Prevalence Score | 6 |
| SQIP Score | 2.733 |

Accordingly, each key phrase of the key phrase sets may have a SQIP score generated by key phrase scorer 512. The SQIP scores for the key phrases found to be present in a textual message may be used by textual message scorer 514 to generate a score for the textual message. The generated textual messages scores for key phrases included in query 112 are included in query response 114, which is returned from message repository 108, as shown in FIG. 5.

B. Example Embodiments for Determining Conversation Risk

As described above, predator identification system 106 of FIG. 1 and of FIG. 3 may calculate a conversation risk for each conversation between suspect and potential victim in textual messages 110. The predator identification systems are configured to calculate the conversation risks based at least on the scored textual messages received in query response 114. Predator identification systems may perform the determination in various ways.

For example, as described above, FIG. 4B shows a flowchart 400 providing a process for determining a conversation risk, according to an example embodiment. Furthermore, conversation risk determiner 304 of FIG. 5 includes an average suspect key phrases score determiner 502, a group count ID generator 504, a suspect textual score generator 506, an estimated age imbalance score generator 508, and a conversation risk score generator 510. In an embodiment, predator identification system 106 of FIG. 5 may operate according to flowchart 4B. Note that the steps of flowchart 400 do not have to be performed in the order shown in FIG. 4B. Flowchart 400 of FIG. 4 and predator identification system 106 of FIG. 5 are described as follows.

Flowchart 400 of FIG. 4B begins with step 402. In step 402, a highest score is selected for the scored textual messages of the corresponding conversation for each set of the plurality of sets of key phrases having a score to generate one or more highest scores. Referring to FIG. 5, average suspect key phrases score determiner 502 receives scored textual messages 308. As described above, in an embodiment, each scored textual message includes a key phrase score for each key phrase that was determined by textual message scorer 514 to be present in the textual message. For each conversation, average suspect key phrases score determiner 502 is configured to select a highest key phrase score for each of the key phrase sets from that conversation's textual messages. When seven key phrase sets are being used, up to seven highest key phrase scores may be determined for a conversation. If a conversation has no key phrase score for a particular key phrase set, the highest key phrase score for that key phrase set is regarded as zero.

In step 404, the suspect-to-potential victim pair is discarded if the one or more highest scores includes fewer than a predetermined number of highest scores. In an embodiment, average suspect key phrases score determiner 502 is configured to analyze each conversation to determine any conversations having a number of non-zero highest key phrase scores fewer than a predetermine threshold (e.g., three or other number), discarding any such determined conversations from further analysis. A conversation having less than this predetermined number of highest key phrase scores is not likely to be a predatory conversation.

In step 406, the one or more highest scores is/are combined to generate an average suspect key phrases score. In an embodiment, average suspect key phrases score determiner 502 is configured, for each conversation, to combine together the highest key phrase scores determined in step 402 to generate an average. For instance, average suspect key phrases score determiner 502 may sum the highest key phrase scores, and divide the sum by the number of key phrase sets (e.g., seven), to determine an average suspect key phrases score for each conversation.

In step 408, the average suspect key phrases score is multiplied by a group count ID score to generate a suspect textual score. In an embodiment, suspect textual score generator 506 is configured, for each conversation, to multiply the average suspect key phrases score determined by average suspect key phrases score determiner 502 for the conversation by a group count ID score for the conversation. The group count ID score has a value that represents whether a conversation has at least one key phrase score per key phrase set. In an embodiment, group count ID generator 504 is configured to generate a group count ID score for each conversation.

For instance, for each conversation, group count ID generator 504 may generate a group count ID as a seven-digit binary string (in a seven-key phrase set example). This string provides an insight into the possible narrative of the suspect's communications with the potential victim. In an example, a positive result (key phrase score is present for a set) may be represented by a numerical 1 symbol, and a negative result (no key phrase results for a set) may be represented by 0 symbol. In alternative embodiments, other values and representations may be used.

In an embodiment, for each conversation, the binary symbols are combined into a string in the set order of: Vulnerability Identification, Relationship, Flirtation, Confession, Sexual Exchange, Sexual Abstract, and Isolation.

For instance, an illustrative conversation may have the following maximum key phrase scores for these seven key phrase sets.

| Vulnerability Identification | Relationship | Flirtation | Confession | Sexual Exchange | Sexual Abstract | Isolation |
|---|---|---|---|---|---|---|
| 25.4956 | 0 | 1.0982 | 12.8853 | 0 | 0 | 20.8741 |

In such an embodiment, group count ID generator 504 may generate a group count ID of 1011001 for the conversation.

Group count ID generator 504 is configured to generate a group count ID score based on the generated group count ID string. For instance, in an embodiment, group count ID generator 504 may generate the score for a conversation based on the corresponding string as follows: a group count ID with at least threshold number (e.g., three) of positive-results (e.g., '1' symbols) is scored with a numerical value in the range of 0.10 to 1.00. Such a scoring system has been determined by judgment about how well each group count ID displays a narrative structure of a predatory conversation. Every group count ID is a unique portrayal of a possible predatory conversation because the seven key phrase sets represent different themes. The summary of what themes are or are not present in a conversation has unique narrative value.

For example, a conversation with a suspect engaging in Vulnerability Identification, Confession, and Sexual Exchange may be scored higher than a conversation with a suspect engaging in Flirtation, Sexual Exchange, and Sexual Abstract. Though both conversations have three set results, the first conversation has a greater chance of being credible evidence that the suspect is contacting a minor and engaging in inappropriate sexual communications. As such, the group count ID provides an estimation into how explicit the suspect may be in engaging in a predatory conversation and what elements of suspicious behavior are being displayed, and may be configured in various ways, depending on the key phrase set themes that are regarded to be more important relative to others of the key phrase set themes.

Continuing with step 408, suspect textual score generator 506 is configured, for each conversation, to multiply the average suspect key phrases score determined by average suspect key phrases score determiner 502 by the group count ID score determined by group count ID generator 504, to generate a suspect textual score for each conversation.

Referring back to FIG. 4, in step 410, an estimated age imbalance score is generated. In an embodiment, estimated age imbalance score generator 508 is configured to generate an estimated age imbalance score for each conversation, indicating an age differential between the suspect and potential victim of the conversation. Estimated age imbalance score generator 508 may be configured to generate the estimated age imbalance score in various ways. For instance, estimated age imbalance score generator 508 may be configured to generate the estimated age imbalance score according to FIGS. 9-11, as described as follows.

Figure 9:
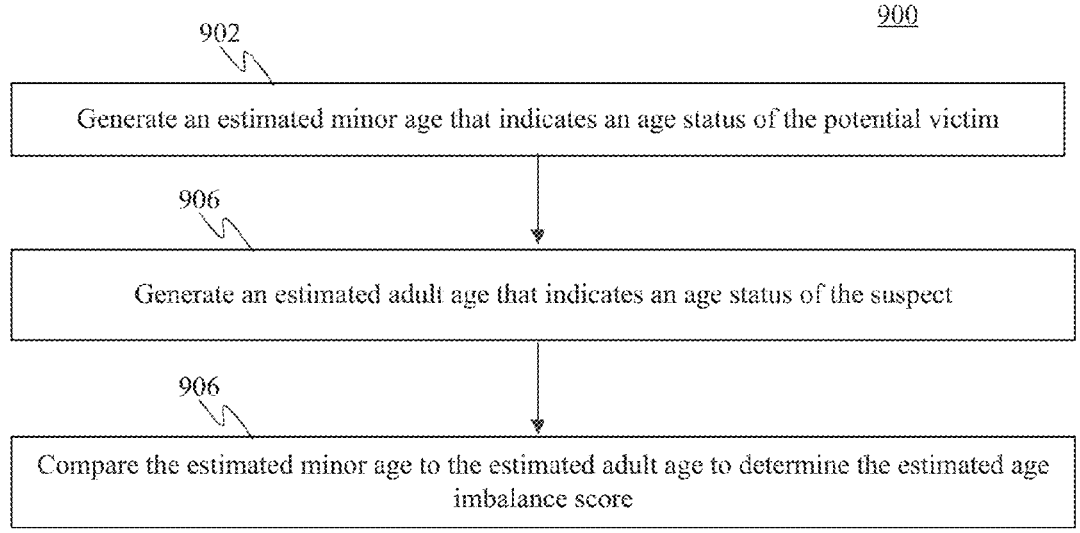
FIG. 9 shows a flowchart providing a process for generating an estimated age imbalance score, according to an example embodiment.

FIG. 9 shows a flowchart 900 providing a process for generating an estimated age imbalance score, according to an example embodiment. In an embodiment, estimated age imbalance score generator 508 may perform flowchart 900 for each conversation. Note that the steps of flowchart 900 do not have to be performed in the order shown in FIG. 9. Flowchart 900 is described as follows.

Flowchart 900 begins with step 902. In step 902, an estimated minor age that indicates an age status of the potential victim is generated. Estimated age imbalance score generator 508 may be configured to generate an estimated minor age that indicates an age status of the potential victim of the conversation, and may perform this function in various ways. For instance, estimated age imbalance score generator 508 may generate the estimated minor age according to FIGS. 10A and 10B.

Figure 10A:
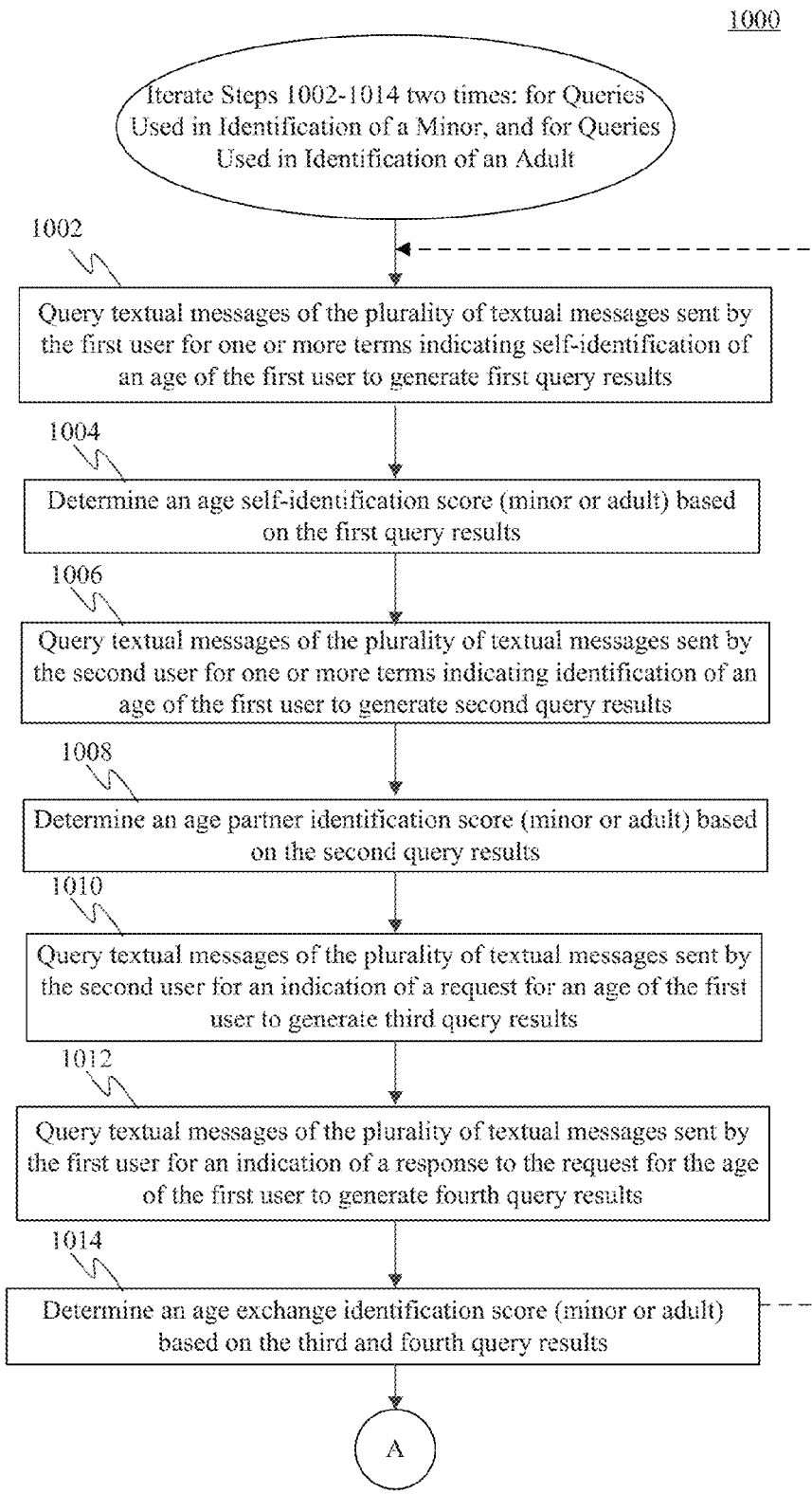
FIGS. 10A and 10B show a flowchart providing a process for generating an estimated age that indicates an age status of the potential victim or the suspect, according to an example embodiment.
Figure 10B:
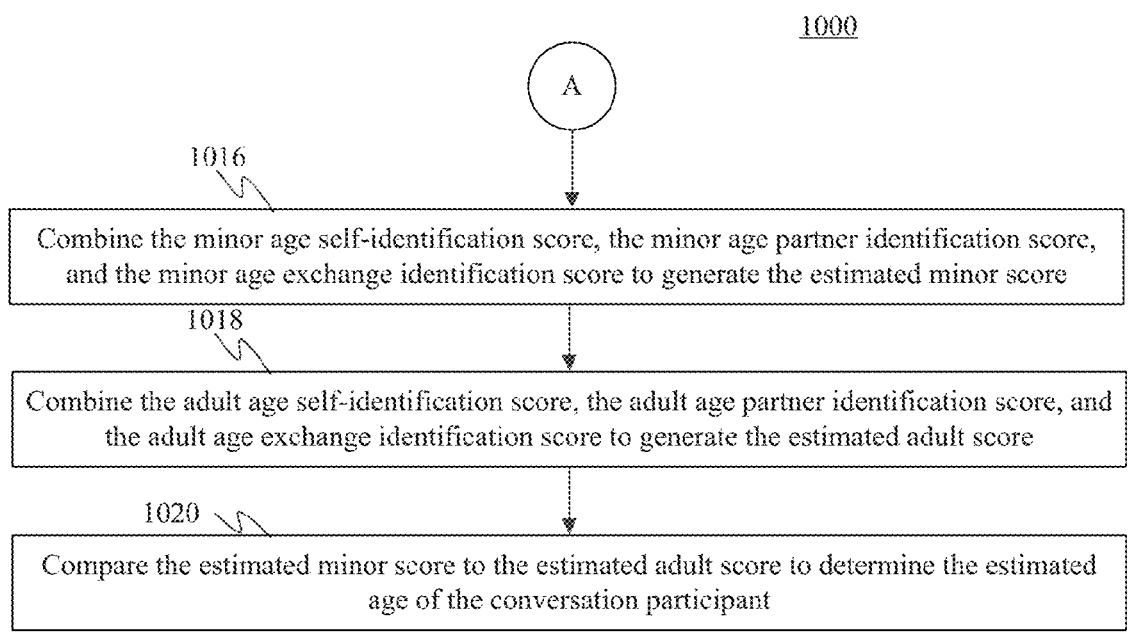

FIGS. 10A and 10B show a flowchart 1000 providing a process for generating an estimated age that indicates an age status of the potential victim or the suspect, according to an example embodiment. In one implementation, estimated age imbalance score generator 508 may perform steps 1002-1014 twice before performing steps 1016-1020. Steps 1002-1014 may be performed a first time with the queries used in identification of the potential victim as a minor, and a second time with the queries used in identification of the potential victim as an adult (or in reverse order). Accordingly, as indicated in parenthesis "(minor or adult)", steps 1004, 1008, and 1014 may be performed for the identification of minor or adult, depending on the iteration being performed. The potential victim is referred to as the "first user" and the suspect as the "second user" during the iteration of flowchart 1000 for the potential victim in step 902. Note that in step 904 (described below), flowchart 1000 is performed a second time to generate an estimated age of the suspect.

Furthermore, note that the steps of flowchart 1000 do not have to be performed in the order shown in FIGS. 10A and 10B. Flowchart 1000 is described as follows.

Flowchart 1000 begins with step 1002. In step 1002, textual messages of the plurality of textual messages sent by the first user are queried for one or more terms indicating self-identification of an age of the first user to generate first query results. For example, estimated age imbalance score generator 508 may be configured to analyze the textual messages of the conversation for any textual messages that list the potential victim as sender, and that contain one or more terms (words/key phrases) indicating the potential victim has identified their age (e.g., "I am 13 years old") as a minor (first iteration of steps 1002-1014) or as an adult (second iteration of steps 1002-1014). To perform this function, estimated age imbalance score generator 508 may generate a new query (with appropriate key phrases) that is applied to message repository 108, or may analyze the textual messages included in scored textual messages 308.

In step 1004, an age self-identification score is determined based on the first query results. In an embodiment, estimated age imbalance score generator 508 may use a highest "QI score" determined from the textual messages found in step 1002 to be the age self-identification score. However, if there are no results (no QI score is determined), the self-identification score is regarded as zero.

The QI score is a numerical value for messages of age identification by a first and second users in a conversation. Any textual message that has a positive return on any of a set of relevant key phrases (used for an indication of age identification, such as "my age is", "I was born in," etc.) is assigned a QI score in a predetermined range, such as 0.0015 to 1. The QI score represents how likely the user is in the age status being queried.

The QI score is similar to the SQIP score in that it contains the Quality and Intensity scores. The ranking and scoring systems for the Quality and Intensity scores for the QI score may be the same as described above for a SQIP score. For instance, the Quality score (e.g., possible score in range of 1 to 49) is multiplied by the Intensity score (e.g., possible score in the range of 1 to 14), and the product is divided by the highest possible score (e.g., 686) to return a QI score between 0.0015 and 1.

Accordingly, in an embodiment of step 1004, the highest QI score determined for the textual messages of the conversation, where the victim has self-identified their age, is used as the age self-identification score. In the first performance of step 1004 (minor), a minor age self-identification score is determined, and in the second performance of step 1004 (adult), an adult age self-identification score is determined.

In step 1006, textual messages of the plurality of textual messages sent by the second user are queried for one or more terms indicating identification of an age of the first user to generate second query results. For example, estimated age imbalance score generator 508 may be configured to analyze the textual messages of the conversation for any textual messages that list the suspect as sender, and that contain one or more terms indicating an age of the potential victim (e.g., "You are 13 years old") as a minor (first iteration of steps 1002-1014) or as an adult (second iteration of steps 1002-1014). To perform this function, estimated age imbalance score generator 508 may generate a new query (with appropriate key phrases) that is applied to message repository 108, or may analyze the textual messages included in scored textual messages 308.

In step 1008, an age partner identification score is determined based on the second query results. In an embodiment, estimated age imbalance score generator 508 may use a highest QI score determined from the textual messages found in step 1006 to be the age partner identification score. The QI score may be determined in a similar manner as described above with respect to step 1004. If there are no results (no QI score is determined), the age partner identification score is regarded as zero. In the first iteration of step 1008 (minor), a minor age partner identification score is determined, and in the second iteration of step 1004 (adult), an adult age partner identification score is determined.

In step 1010, textual messages of the plurality of textual messages sent by the second user are queried for an indication of a request for an age of the first user to generate third query results. For example, estimated age imbalance score generator 508 may be configured to analyze the textual messages of the conversation for any textual messages that list the suspect as sender, and that contain one or more terms indicating a request for the age of the potential victim (e.g., "Tell me your age", "how old are you") as a minor (first iteration of steps 1002-1014) or as an adult (second iteration of steps 1002-1014). To perform this function, estimated age imbalance score generator 508 may generate a new query (with appropriate key phrases) that is applied to message repository 108, or may analyze the textual messages included in scored textual messages 308.

In step 1012, textual messages of the plurality of textual messages sent by the first user are queried for an indication of a response to the request for the age of the first user to generate fourth query results. For example, estimated age imbalance score generator 508 may be configured to analyze the textual messages of the conversation for any textual messages that list the potential victim as sender, and that contain one or more terms indicating an answer to the request for the age of the potential victim (e.g., "I am 13 years old"). To perform this function, estimated age imbalance score generator 508 may generate a new query (with appropriate key phrases) that is applied to message repository 108, or may analyze the textual messages included in scored textual messages 308.

In step 1014, an age exchange identification score is determined based on the third and fourth query results. Estimated age imbalance score generator 508 may be configured to determine an age exchange identification score based on the third and fourth query results generated in steps 1010 and 1012, in any manner. For instance, in an embodiment, estimated age imbalance score generator 508 may be configured to determine the age exchange identification score according to FIG. 11.

Figure 11:
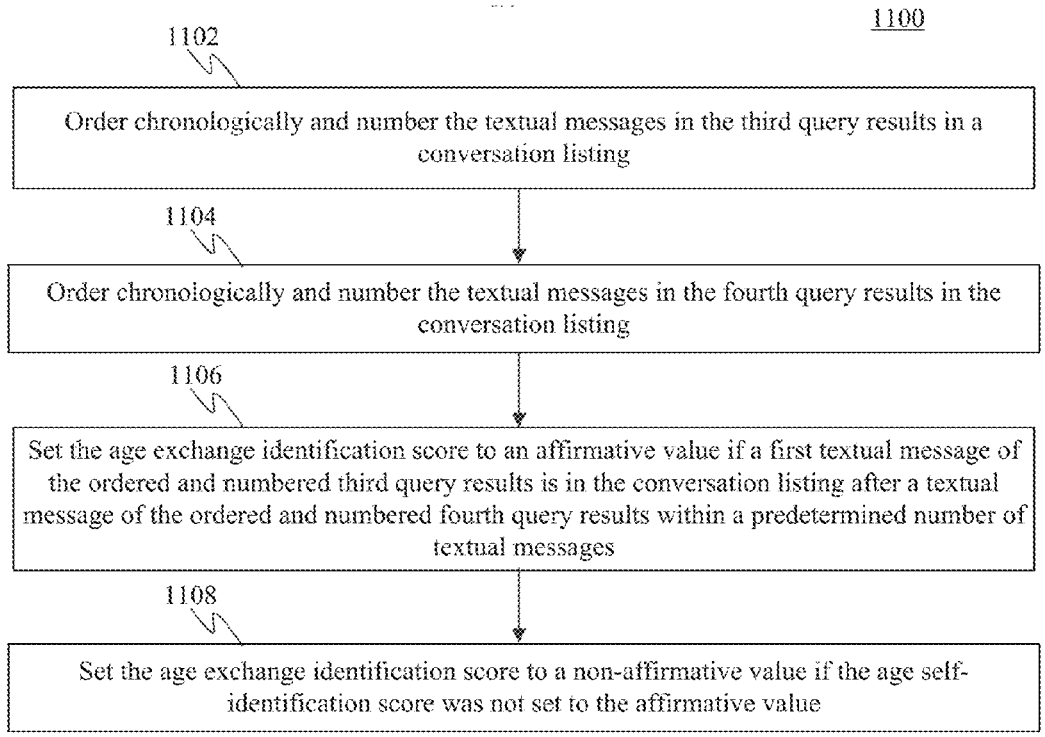
FIG. 11 shows a flowchart providing a process for determining a minor age exchange identification score, according to an example embodiment.

FIG. 11 shows a flowchart 1100 providing a process for determining an age exchange identification score, according to an example embodiment. Note that the steps of flowchart 1100 do not have to be performed in the order shown in FIG. 11. In the first iteration of flowchart 1100 (minor), a minor age exchange identification score is determined, and in the second iteration of flowchart 1100 (adult), an adult age exchange identification score is determined. Flowchart 1100 is described as follows.

Flowchart 1100 begins with step 1102. In step 1102, the textual messages in the third query results are ordered and numbered chronologically in a conversation listing. In an embodiment, for the results of step 1010 (FIG. 10A), estimated age imbalance score generator 508 is configured to note each of the determined text messages (having a request from the suspect for the age of the potential victim) with a line number marking what row the text message is located in the conversation, ordered chronologically.

In step 1104, the textual messages in the fourth query results are ordered and numbered chronologically in the conversation listing. In an embodiment, for the results of step 1012 (FIG. 10A), estimated age imbalance score generator 508 is configured to note each of the determined text messages (having an answer from the potential victim to a request from the suspect for their age) with a line number marking what row the text message is located in the conversation, ordered chronologically.

In step 1106, the age exchange identification score is set to an affirmative value if a first textual message of the ordered and numbered third query results is in the conversation listing after a textual message of the ordered and numbered fourth query results within a predetermined number of textual messages. In an embodiment, estimated age imbalance score generator 508 is configured to set the age exchange identification score to an affirmative value (e.g., "1") if, as determined by the line numbering and chronological ordering of the textual messages in the third and fourth query results, it is indicated that the textual message response from the potential victim to the age-related question was sent by the potential victim immediately after the suspect asked the age-related question (the potential victim answered the question in the next textual message exchanged), or if the potential victim's response is within three line numbers (or other pre-determined number of lines) after the line number of the age-related question from the suspect.

In step 1108, the age exchange identification score is set to a non-affirmative value if the age exchange identification score was not set to the affirmative value. In an embodiment, estimated age imbalance score generator 508 is configured to set the age exchange identification score to a non-affirmative value (e.g., "0") if step 1106 does not result in an affirmative value (e.g., the potential victim did not respond to the age-related question from the suspect, or responded after the pre-determined number of textual messages had been sent).

Referring back to flowchart 1000 in FIG. 10A, in step 1016, the minor age self-identification score, the minor partner age identification score, and the minor age exchange identification score are combined to generate the estimated minor score. In an embodiment, estimated age imbalance score generator 508 is configured to combine the minor age self-identification score (of step 1004 during minor iteration), the minor partner age identification score (of step 1008 during minor iteration), and the minor age exchange identification score (of step 1014/flowchart 1100 during minor iteration), such as by summing the three scores, to generate the estimated minor score.

In step 1018, the adult age self-identification score, the adult age partner identification score, and the adult age exchange identification score are combined to generate the estimated adult score. In an embodiment, estimated age imbalance score generator 508 is configured to combine the adult age self-identification score (of step 1004 during adult iteration), the adult partner age identification score (of step 1008 during adult iteration), and the adult age exchange identification score (of step 1014/flowchart 1100 during adult iteration), such as by summing the three scores, to generate the estimated adult score.

In step 1020, the estimated minor score is compared to the estimated adult score to determine the estimated age of the conversation participant. In an embodiment, the estimated age imbalance score generator 508 is configured to compare the estimated minor score (of step 1016) to the estimated adult score (of step 1018) to determine the estimated age of the conversation participant (suspect or potential victim) being analyzed in the current iteration of flowchart 1000. The estimated age may be a numerical age or may have other forms.

For instance, in an embodiment, the estimated age is a string value that represents the confidence of the age group (minor or adult) a conversation participant may be a part of, based on textual analysis. The values of the estimated minor score and estimated adult score may be compared and the estimated age is the higher value within particular ranges, or the textual analysis is considered too close, and the estimated age is indicated as 'Mixed.' If there is no evidence for an estimated minor score and estimated adult score, the estimated age is not processed and is indicated 'NA.' Table 7 below shows an example assignment of estimated age based on the values of the estimated minor score and estimated adult score:

TABLE 7

| Estimated Adult Score | Estimated Minor Score | | | |
|---|---|---|---|---|
| | 0.0 | 0.0001-0.6 | 0.6001-0.9999 | 1-3 |
| 0.0 | NA | Minor_Weak | Minor_Strong | Minor_Strong |
| 0.0001-0.6 | Adult_Weak | Mixed | Minor_Strong | Minor_Strong |
| 0.6001-0.9999 | Adult_Strong | Adult_Strong | Mixed | Minor_Strong |
| 1-3 | Adult_Strong | Adult_Strong | Adult_Strong | Mixed |

Accordingly, values such as "Adult_Weak," "Minor_Weak," "Adult_Strong," and "Minor_Strong" may be assigned to the estimated age as indications of age. In one example with illustrative values, the estimated minor score may be 0.6511, the estimated adult score may be 1.0235, and the estimated age is determined from Table 7 to be "Adult_Strong."

In this manner, in step 902 of flowchart 900 (FIG. 9), an estimated age may be determined for the potential victim. The estimated age may be determined in other ways, in embodiments.

Referring to flowchart 900 in FIG. 9, in step 904, an estimated adult age is generated that indicates an age status of the suspect. Estimated age imbalance score generator 508 may be configured to generate an estimated adult age that indicates an age status of the suspect of the conversation, and may perform this function in various ways. For instance, estimated age imbalance score generator 508 may generate the estimated adult age in a similar manner as the estimated minor age was generated in step 902. In an embodiment, estimated age imbalance score generator 508 may generate the estimated adult age according to flowcharts 1000 and 1100 (FIGS. 10 and 11), where the suspect is considered the conversation participant. Estimated age imbalance score generator 508 may perform steps 1002-1014 twice before performing steps 1016-1020. Steps 1002-1014 may be iterated a first time with the queries used in identification of the suspect as a minor, and a second time with the queries used in identification of the suspect as an adult (or in reverse order). The suspect is referred to as the "first user" and the potential victim as the "second user" during the iteration of flowchart 1000 for the suspect in step 904. Upon performance of step 904 in this manner, an estimated adult age is generated that indicates an age status of the suspect.

In step 906, the estimated minor age is compared to the estimated adult age to determine the estimated age imbalance score. Estimated age imbalance score generator 508 may be configured to generate an estimated age imbalance score by comparing the estimated adult age to the estimated minor age. In an embodiment, the age-imbalance score is a numerical value representing how much a conversation's scoring is to be modified by the likelihood that the participants are an adult a minor. The estimated age values of both users in a conversation are compared. An outcome of the comparison that indicates a high possibility that the conversation participants may be in separate age statuses are given a higher estimated age imbalance score. As described further below, the estimated age imbalance score is multiplied with the suspect textual score (and optionally, a modification may be made based on whether pictures were exchanged) to produce the conversation risk score. The same score applies even if the age-imbalance is found with the 'suspect' as the minor and the 'victim' as the adult.

Estimated age imbalance score generator 508 may compare the estimated adult age to the estimated minor age in any manner to generate an estimated age imbalance score. For example, Table 8 illustrates a comparing of the estimated adult age and the estimated minor age to generate an estimated age imbalance score.

TABLE 8

| User2 Estimated Age | User1 Estimated Age | | | | | |
|---|---|---|---|---|---|---|
| | NA | Mixed | Minor_Weak | Minor_Strong | Adult_Weak | Adult_Strong |
| NA | 1.0 | 1.0 | 1.0 | 2.0 | 1.0 | 1.0 |
| Mixed | 1.0 | 1.0 | 1.0 | 2.0 | 1.0 | 1.0 |
| Minor_Weak | 1.0 | 1.0 | 1.0 | 1.5 | 2.0 | 2.5 |
| Minor_Strong | 2.0 | 2.0 | 1.5 | 1.0 | 3.0 | 4.0 |
| Adult_Weak | 1.0 | 1.0 | 2.0 | 3.0 | 1.0 | 1.0 |
| Adult_Strong | 1.0 | 1.0 | 2.5 | 4.0 | 1.0 | 1.0 |

In an illustrative example, if the potential victim (e.g., user1) has an estimated minor age of "Minor_Strong", and the suspect (e.g., user2) has an estimated adult age of "Adult_Weak," the estimated age imbalance score is found in Table 8 to be 3.0. In other embodiments, the estimated age imbalance score may be generated in other ways.

Referring back to FIG. 4, in step 412, the suspect textual score is modified according to the estimated age imbalance score to generate a conversation risk score for the suspect-to-potential victim pair. In an embodiment, conversation risk score generator 510 may receive the estimated age imbalance score from estimated age imbalance score generator 508 and the suspect textual score from suspect textual score generator 506, and may combine them to generate a conversation risk score 310. For example, conversation risk score generator 510 may multiply the estimated age imbalance score by the suspect textual score to generate conversation risk score 310.

In another embodiment, conversation risk score generator 510 may take into account whether any images, including pictures or videos of the suspect and/or the potential victim (or other multi-media objects, such as voice files, links, etc.), were sent between the suspect and potential victim. Such an exchange of images may be considered as heightened factors regarding whether a conversation is considered to be predatory, raising concern.

Figure 12:
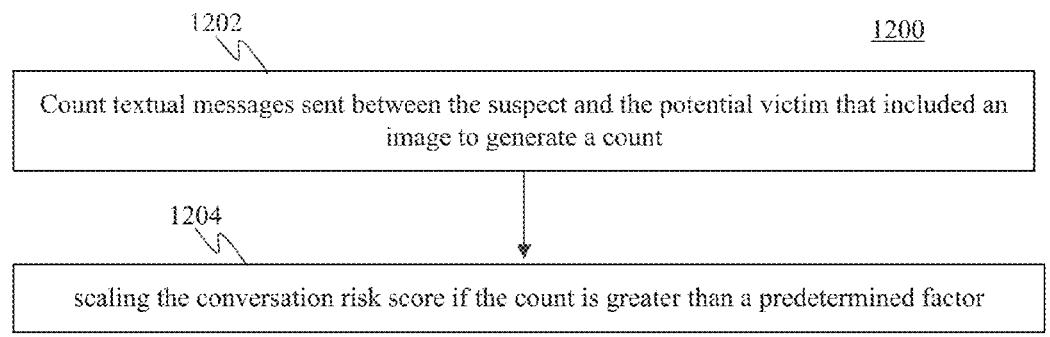
FIG. 12 shows a flowchart providing a process for modifying the suspect textual score according to the estimated age imbalance score to generate a conversation risk score, according to an example embodiment.

For instance, FIG. 12 shows a flowchart 1200 providing a process for modifying the suspect textual score according to the estimated age imbalance score to generate a conversation risk score, according to an example embodiment. In an embodiment, flowchart 1200 may be performed by conversation risk score generator 510 for each conversation. Flowchart 1200 is described as follows.

Flowchart 1200 begins with step 1202. In step 1202, textual messages sent between the suspect and the potential victim that included an image are counted to generate a count. In an embodiment, conversation risk score generator 510 is configured to perform a count of textual messages sent between the suspect and potential victim that include images (e.g., embedded, as attachments). Conversation risk score generator 510 may perform this count by instructing query engine 302 to issue another query to message repository 108, by analyzing scored textual messages 308, or in any other manner.

In step 1204, the conversation risk score is scaled if the count is greater than a predetermined factor. In an embodiment, conversation risk score generator 510 is configured to scale (e.g., increase) conversation risk score 310 if the count of messages including images for a conversation is greater than a threshold number, such as zero or other value. When zero is the threshold value, this indicates that if any number of images were exchanged, the conversation risk has increased.

Any suitable scaling factor may be used. For instance, conversation risk score generator 510 may be configured to multiply conversation risk score 310 (generated in step 412) by a scaling factor of three to generate a scaled version of conversation risk score 310. By using a scale factor greater than 1, conversation risk score 310 is increased due to the increased risk of a predatory conversation due to images having been exchanged.

Accordingly, flowchart 400 of FIG. 4B results in conversation risk score 310 being generated for each conversation between a suspect and potential victim in textual messages 110 in message repository 108. A higher conversation risk scores indicates a higher risk of a conversation being predatory, while a lower conversation risk score indicates less risk of a conversation being predatory. Flowchart 400 may be performed according to any frequency, and at any time that it is desired to check for predatory conversations (to aid in apprehending predators), such as every day, every week, every month, every six months, on an ad hoc basis, etc. The performance of flowchart 400 may analyze all textual messages 110 in message repository 108, or a portion of textual messages 110 (e.g., textual messages sent over a predetermined time period of months or years).

C. Example Embodiments for Ranking Conversation Risk

As described above, the conversation risk scores determined by a predator identification system optionally may be ranked, which may enable more convenient assessment of the scores, as well as more rapid ascertainment of suspects that warrant looking into. Such ranking may be performed in any manner.

Figure 13:
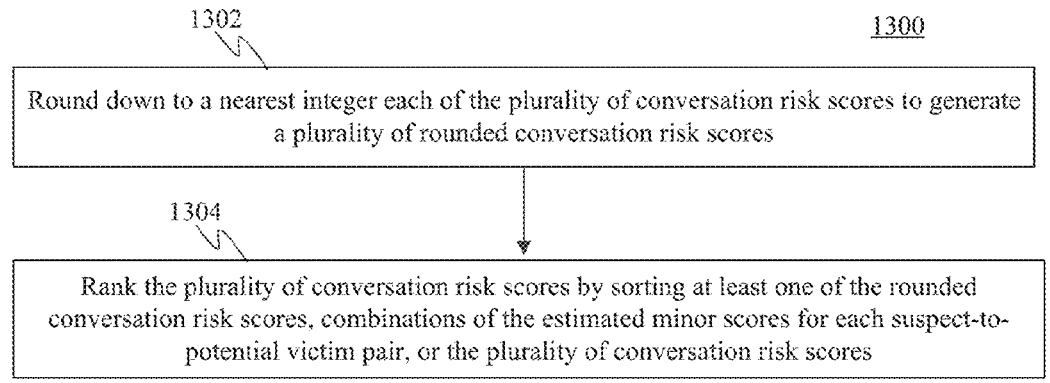
FIG. 13 shows a flowchart providing a process for ranking conversation risk scores, according to an example embodiment.

For instance, FIG. 13 shows a flowchart 1300 providing a process for ranking conversation risk scores, according to an example embodiment. In an embodiment, flowchart 1300 may be performed by conversation ranker 306 of FIG. 3 (or FIG. 5). Flowchart 1300 is described as follows.

Flowchart 1300 of FIG. 13 begins with step 1302. In step 1302, each of the plurality of conversation risk scores is rounded down to a nearest integer to generate a plurality of rounded conversation risk scores. As shown in FIG. 3, conversation ranker 306 receives conversation risk scores 310, which includes a plurality of conversation risk scores, each conversation risk score corresponding to a conversation (in the form of textual messages) between a suspect and potential victim. In an embodiment, conversation risk scores 306 may have non-integer values. Accordingly, step 1302 may be optionally performed to round conversation risk scores 306 to each have integer values. The rounding may be up (to next highest integer) or down (to next lowest integer) in embodiments.

In step 1304, the plurality of conversation risk scores is ranked by sorting at least one of the rounded conversation risk scores, combinations of the estimated minor scores for each suspect-to-potential victim pair, or plurality of conversation risk scores. In embodiments, conversation ranker 306 may rank (optionally rounded) conversation risk scores 306 in any manner, such as in a numerical order (e.g., highest risk score to lowest risk score), etc. Furthermore, conversation ranker 306 can perform multiple rankings, including ranking information in addition to or alternative to conversation risk scores 306. For instance, conversation ranker 306 may perform one or more of: ranking the rounded conversation risk scores 306 from highest to lowest, ranking a combination (e.g., addition) of the estimated minor scores of both the suspect and potential victim from highest to lowest, and/or ranking conversation risk scores 306 (non-rounded).

III. Example Mobile and Stationary Device Embodiments

Computing device 102, predator identification system 106, query engine 302, conversation risk determiner 304, conversation ranker 306, average suspect key phrases score determiner 502, group count ID generator 504, suspect textual score generator 506, estimated age imbalance score generator 508, conversation risk score generator 510, key phrase scorer 512, textual message scorer 514, flowchart 200, step 420, flowchart 400, flowchart 900, flowchart 1000, flowchart 1100, flowchart 1200, and flowchart 1300 may be implemented in hardware, or hardware combined with software and/or firmware. For example, query engine 302, conversation risk determiner 304, conversation ranker 306, average suspect key phrases score determiner 502, group count ID generator 504, suspect textual score generator 506, estimated age imbalance score generator 508, conversation risk score generator 510, key phrase scorer 512, textual message scorer 514, flowchart 200, step 420, flowchart 400, flowchart 900, flowchart 1000, flowchart 1100, flowchart 1200, and/or flowchart 1300 may be implemented as computer program code/instructions configured to be executed in one or more processors and stored in a computer readable storage medium. Alternatively, computing device 102, query engine 302, conversation risk determiner 304, conversation ranker 306, average suspect key phrases score determiner 502, group count ID generator 504, suspect textual score generator 506, estimated age imbalance score generator 508, conversation risk score generator 510, key phrase scorer 512, textual message scorer 514, flowchart 200, step 420, flowchart 400, flowchart 900, flowchart 1000, flowchart 1100, flowchart 1200, and/or flowchart 1300 may be implemented as hardware logic/electrical circuitry.

For instance, in an embodiment, one or more, in any combination, of computing device 102, query engine 302, conversation risk determiner 304, conversation ranker 306, average suspect key phrases score determiner 502, group count ID generator 504, suspect textual score generator 506, estimated age imbalance score generator 508, conversation risk score generator 510, key phrase scorer 512, textual message scorer 514, flowchart 200, step 420, flowchart 400, flowchart 900, flowchart 1000, flowchart 1100, flowchart 1200, and/or flowchart 1300 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 14:
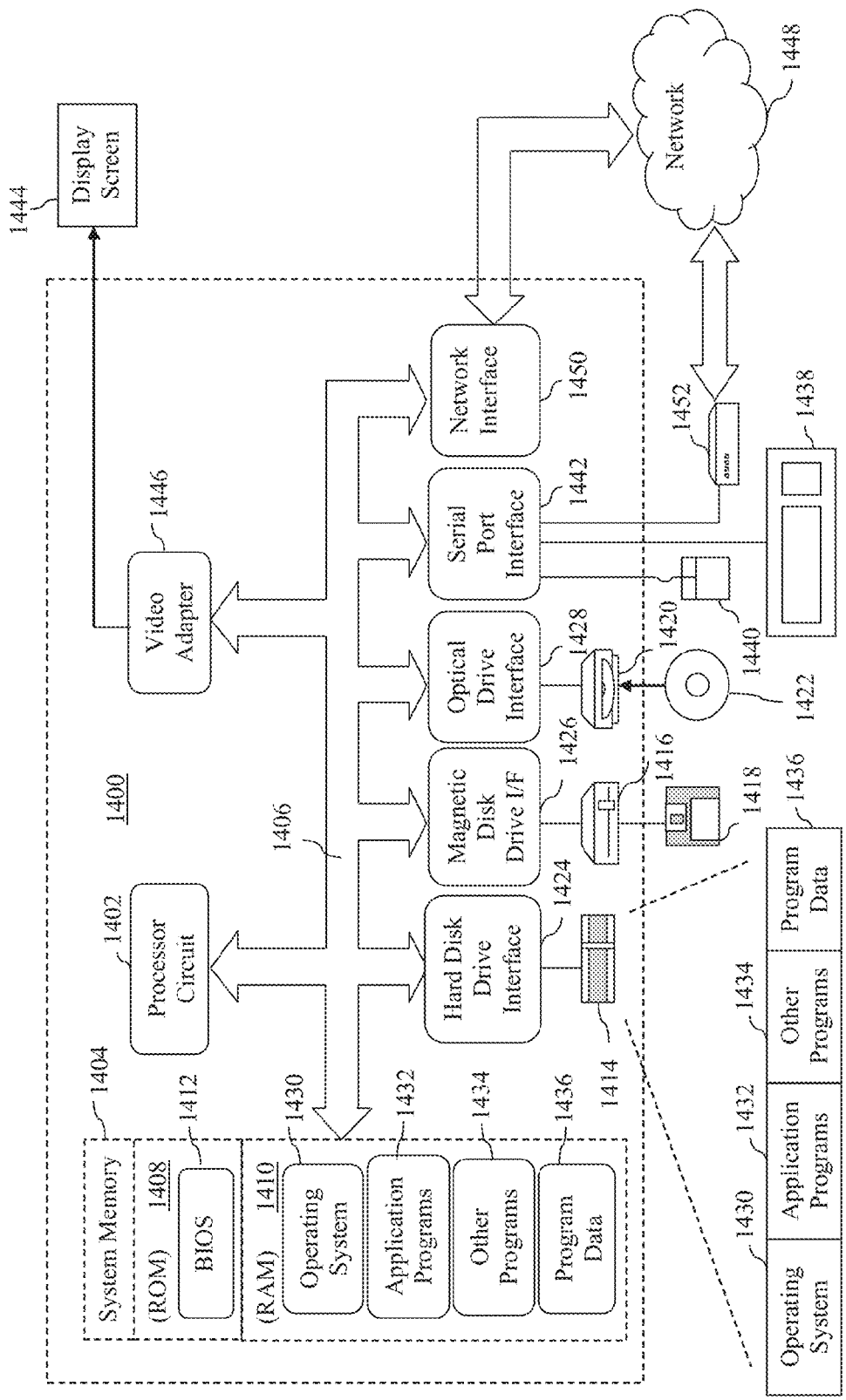
FIG. 14 shows a block diagram of an example computing device that may be used to implement embodiments.

FIG. 14 depicts an exemplary implementation of a computing device 1400 in which embodiments may be implemented. For example, computing device 102 may be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems, as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing query engine 302, conversation risk determiner 304, conversation ranker 306, average suspect key phrases score determiner 502, group count ID generator 504, suspect textual score generator 506, estimated age imbalance score generator 508, conversation risk score generator 510, key phrase scorer 512, textual message scorer 514, flowchart 200, step 420, flowchart 400, flowchart 900, flowchart 1000, flowchart 1100, flowchart 1200, and/or flowchart 1300 (including any suitable step of flowcharts 200, 400, 900, 1000, 1100, 1200, and 1300), and/or further embodiments described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

In an embodiment, a computing device comprises: at least one processor circuit; and a memory that stores program code configured to be executed by the at least one processor circuit to perform operations, the operations including: querying a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and determining a plurality of conversation risk scores based at least on the scored textual messages, each conversation risk score indicating an estimate of a risk of predatory behavior occurring during the corresponding conversation.

In an embodiment, the determining a plurality of conversation risk scores based at least on the scored textual messages comprises: generating a conversation risk score for each suspect-to-potential victim pair by analyzing textual messages of the corresponding conversation, including: selecting a highest score for the scored textual messages of the corresponding conversation for each set of the plurality of sets of key phrases having a score to generate one or more highest scores, discarding the suspect-to-potential victim pair if the one or more highest scores includes fewer than a predetermined number of highest scores, combining the one or more highest scores to generate an average suspect key phrases score, multiplying the average suspect key phrases score by a group count ID to generate a suspect textual score, generating an estimated age imbalance score, and modifying the suspect textual score according to the estimated age imbalance score to generate a conversation risk score for the suspect-to-potential victim pair.

In an embodiment, the generating an estimated age imbalance score comprises: generating an estimated minor age that indicates an age status of the potential victim; generating an estimated adult age that indicates an age status of the suspect; and comparing the estimated minor age to the estimated adult age to determine the estimated age imbalance score.

In an embodiment, the generating an estimated minor age that indicates an age status of the potential victim comprises: performing a loop for queries used in identification of a minor, the loop including: querying textual messages of the plurality of textual messages sent by the potential victim for one or more terms indicating self-identification of an age of the potential victim to generate first query results, determining a minor age self-identification score based on the first query results, querying textual messages of the plurality of textual messages sent by the suspect for one or more terms indicating identification of an age of the potential victim to generate second query results, determining a minor partner age identification score based on the second query results, querying textual messages of the plurality of textual messages sent by the suspect for an indication of a request for an age of the potential victim to generate third query results, querying textual messages of the plurality of textual messages sent by the potential victim for an indication of a response to the request for the age of the potential victim to generate fourth query results, and determining a minor age exchange identification score based on the third and fourth query results; and performing the loop for queries used in identification of an adult, to determine an adult age self-identification score, an adult age partner identification score, and an adult age exchange identification score; combining the minor age self-identification score, the minor partner age identification score, and the minor age exchange identification score to generate the estimated minor score; combining the adult age self-identification score, the adult age partner identification score, and the adult age exchange identification score to generate the estimated adult score; and comparing the estimated minor score to the estimated adult score to determine the estimated minor age.

In an embodiment, the determining a minor age exchange identification score based on the third and fourth query results comprises: ordering chronologically and numbering the textual messages in the third query results in a conversation listing; ordering chronologically and numbering the textual messages in the fourth query results in the conversation listing; setting the minor age exchange identification score to an affirmative value if a first textual message of the ordered and numbered third query results is in the conversation listing after a textual message of the ordered and numbered fourth query results within a predetermined number of textual messages; and setting the minor age exchange identification score to a non-affirmative value if the minor age exchange identification score was not set to the affirmative value.

In an embodiment, the modifying the suspect textual score according to the estimated age imbalance score to generate a conversation risk score for the suspect-to-potential victim pair further comprises: counting textual messages sent between the suspect and the potential victim that included an image to generate a count; and scaling the conversation risk score if the count is greater than a predetermined factor.

In an embodiment, the operations further including: rounding down to a nearest integer each of the plurality of conversation risk scores to generate a plurality of rounded conversation risk scores; and ranking the plurality of conversation risk scores by sorting at least one of the rounded conversation risk scores, combinations of the estimated minor scores for each suspect-to-potential victim pair, or the plurality of conversation risk scores.

In another embodiment, a method is provided. The method comprises, querying a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and determining a plurality of conversation risk scores based at least on the scored textual messages, each conversation risk score indicating an estimate of a risk of predatory behavior occurring during the corresponding conversation.

In an embodiment, the determining comprises: generating a conversation risk score for each suspect-to-potential victim pair by analyzing textual messages of the corresponding conversation, including: selecting a highest score for the scored textual messages of the corresponding conversation for each set of the plurality of sets of key phrases having a score to generate one or more highest scores, discarding the suspect-to-potential victim pair if the one or more highest scores includes fewer than a predetermined number of highest scores, combining the one or more highest scores to generate an average suspect key phrases score, multiplying the average suspect key phrases score by a group count ID to generate a suspect textual score, generating an estimated age imbalance score, and modifying the suspect textual score according to the estimated age imbalance score to generate a conversation risk score for the suspect-to-potential victim pair.

In an embodiment, the generating an estimated age imbalance score comprises: generating an estimated minor age that indicates an age status of the potential victim; generating an estimated adult age that indicates an age status of the suspect; and comparing the estimated minor age to the estimated adult age to determine the estimated age imbalance score.

In an embodiment, the generating an estimated minor age that indicates an age status of the potential victim comprises: performing a loop for queries used in identification of a minor, the loop including: querying textual messages of the plurality of textual messages sent by the potential victim for one or more terms indicating self-identification of an age of the potential victim to generate first query results, determining a minor age self-identification score based on the first query results, querying textual messages of the plurality of textual messages sent by the suspect for one or more terms indicating identification of an age of the potential victim to generate second query results, determining a minor partner age identification score based on the second query results, querying textual messages of the plurality of textual messages sent by the suspect for an indication of a request for an age of the potential victim to generate third query results, querying textual messages of the plurality of textual messages sent by the potential victim for an indication of a response to the request for the age of the potential victim to generate fourth query results, and determining a minor age exchange identification score based on the third and fourth query results; and performing the loop for queries used in identification of an adult, to determine an adult age self-identification score, an adult age partner identification score, and an adult age exchange identification score; combining the minor age self-identification score, the minor partner age identification score, and the minor age exchange identification score to generate the estimated minor score; combining the adult age self-identification score, the adult age partner identification score, and the adult age exchange identification score to generate the estimated adult score; and comparing the estimated minor score to the estimated adult score to determine the estimated minor age.

In an embodiment, the determining a minor age exchange identification score based on the third and fourth query results comprises: ordering chronologically and numbering the textual messages in the third query results in a conversation listing; ordering chronologically and numbering the textual messages in the fourth query results in the conversation listing; setting the minor age exchange identification score to an affirmative value if a first textual message of the ordered and numbered third query results is in the conversation listing after a textual message of the ordered and numbered fourth query results within a predetermined number of textual messages; and setting the minor age exchange identification score to a non-affirmative value if the minor age exchange identification score was not set to the affirmative value.

In an embodiment, the modifying the suspect textual score according to the estimated age imbalance score to generate a conversation risk score for the suspect-to-potential victim pair further comprises: counting textual messages sent between the suspect and the potential victim that included an image to generate a count; and scaling the conversation risk score if the count is greater than a predetermined factor.

In an embodiment, the method further comprises: rounding down to a nearest integer each of the plurality of conversation risk scores to generate a plurality of rounded conversation risk scores; and ranking the plurality of conversation risk scores by sorting at least one of the rounded conversation risk scores, combinations of the estimated minor scores for each suspect-to-potential victim pair, or the plurality of conversation risk scores.

In another embodiment, a system is implemented in at least one computing device. The system comprises: a query engine implemented by at least one processor circuit to query a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and a conversation risk determiner implemented by the at least one processor circuit to determine a plurality of conversation risk scores based at least on the scored textual messages, each conversation risk score indicating an estimate of a risk of predatory behavior occurring during the corresponding conversation.

In an embodiment, to determine a conversation risk score for each conversation corresponding to a suspect-to-potential victim pair, the conversation risk determiner is configured to select a highest score for the scored textual messages of the corresponding conversation for each set of the plurality of sets of key phrases having a score to generate one or more highest scores, discard the suspect-to-potential victim pair if the one or more highest scores includes fewer than a predetermined number of highest scores; combine the one or more highest scores to generate an average suspect key phrases score, multiply the average suspect key phrases score by a group count ID to generate a suspect textual score, generate an estimated age imbalance score, and modify the suspect textual score according to the estimated age imbalance score to generate a conversation risk score for the suspect-to-potential victim pair.

In an embodiment, to generate an estimated age imbalance score, the conversation risk determiner is configured to: generate an estimated minor age that indicates an age status of the potential victim; generate an estimated adult age that indicates an age status of the suspect; and compare the estimated minor age to the estimated adult age to determine the estimated age imbalance score.

In an embodiment, to generate an estimated minor age that indicates an age status of the potential victim, the system performs a loop for queries used in identification of a minor; in the loop, the query engine is configured to: query textual messages of the plurality of textual messages sent by the potential victim for one or more terms indicating self-identification of an age of the potential victim to generate first query results, query textual messages of the plurality of textual messages sent by the suspect for one or more terms indicating identification of an age of the potential victim to generate second query results, query textual messages of the plurality of textual messages sent by the suspect for an indication of a request for an age of the potential victim to generate third query results, and query textual messages of the plurality of textual messages sent by the potential victim for an indication of a response to the request for the age of the potential victim to generate fourth query results; in the loop, the conversation risk determiner is configured to: determine a minor age self-identification score based on the first query results; determine a minor partner age identification score based on the second query results; and determine a minor age exchange identification score based on the third and fourth query results; the loop also performed by the system for queries used in identification of an adult, to determine an adult age self-identification score, an adult age partner identification score, and an adult age exchange identification score; and the conversation risk determiner further configured to: combine the minor age self-identification score, the minor partner age identification score, and the minor age exchange identification score to generate the estimated minor score, combine the adult age self-identification score, the adult age partner identification score, and the adult age exchange identification score to generate the estimated adult score, and compare the estimated minor score to the estimated adult score to determine the estimated minor age.

In an embodiment, to determine a minor age exchange identification score based on the third and fourth query results, the conversation risk determiner is configured to: order chronologically and number the textual messages in the third query results in a conversation listing; order chronologically and number the textual messages in the fourth query results in the conversation listing; set the minor age exchange identification score to an affirmative value if a first textual message of the ordered and numbered third query results is in the conversation listing after a textual message of the ordered and numbered fourth query results within a predetermined number of textual messages; and set the minor age exchange identification score to a non-affirmative value if the minor age exchange identification score was not set to the affirmative value.

In an embodiment, the system further comprises: a conversation ranker configured to round down to a nearest integer each of the plurality of conversation risk scores to generate a plurality of rounded conversation risk scores, and rank the plurality of conversation risk scores by sorting at least one of the rounded conversation risk scores, combinations of the estimated minor scores for each suspect-to-potential victim pair, or the plurality of conversation risk scores.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
   at least one processor circuit; and
   a memory that stores program code configured to be executed by the at least one processor circuit to perform operations, the operations including:
      querying a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and
      determining a plurality of conversation risk scores based at least on the scored textual messages, each conversation risk score indicating an estimate of a risk of predatory behavior occurring during the corresponding conversation.

2. The computing device of claim 1, wherein said determining a plurality of conversation risk scores based at least on the scored textual messages comprises:
   generating a conversation risk score for each suspect-to-potential victim pair by analyzing textual messages of the corresponding conversation, including:
      selecting a highest score for the scored textual messages of the corresponding conversation for each set of the plurality of sets of key phrases having a score to generate one or more highest scores,
      discarding the suspect-to-potential victim pair if the one or more highest scores includes fewer than a predetermined number of highest scores,
      combining the one or more highest scores to generate an average suspect key phrases score,
      multiplying the average suspect key phrases score by a group count ID to generate a suspect textual score,
      generating an estimated age imbalance score, and
      modifying the suspect textual score according to the estimated age imbalance score to generate a conversation risk score for the suspect-to-potential victim pair.

3. The computing device of claim 2, wherein said generating an estimated age imbalance score comprises:
   generating an estimated minor age that indicates an age status of the potential victim;
   generating an estimated adult age that indicates an age status of the suspect; and
   comparing the estimated minor age to the estimated adult age to determine the estimated age imbalance score.

4. The computing device of claim 3, wherein said generating an estimated minor age that indicates an age status of the potential victim comprises:
   performing a loop for queries used in identification of a minor, the loop including:
      querying textual messages of the plurality of textual messages sent by the potential victim for one or more terms indicating self-identification of an age of the potential victim to generate first query results,
      determining a minor age self-identification score based on the first query results,
      querying textual messages of the plurality of textual messages sent by the suspect for one or more terms indicating identification of an age of the potential victim to generate second query results,
      determining a minor partner age identification score based on the second query results,
      querying textual messages of the plurality of textual messages sent by the suspect for an indication of a request for an age of the potential victim to generate third query results,
      querying textual messages of the plurality of textual messages sent by the potential victim for an indication of a response to the request for the age of the potential victim to generate fourth query results, and
      determining a minor age exchange identification score based on the third and fourth query results; and
   performing the loop for queries used in identification of an adult, to determine an adult age self-identification score, an adult age partner identification score, and an adult age exchange identification score;
   combining the minor age self-identification score, the minor partner age identification score, and the minor age exchange identification score to generate the estimated minor score;
   combining the adult age self-identification score, the adult age partner identification score, and the adult age exchange identification score to generate the estimated adult score; and
   comparing the estimated minor score to the estimated adult score to determine the estimated minor age.

5. The computing device of claim 4, wherein said determining a minor age exchange identification score based on the third and fourth query results comprises:
   ordering chronologically and numbering the textual messages in the third query results in a conversation listing;
   ordering chronologically and numbering the textual messages in the fourth query results in the conversation listing;
   setting the minor age exchange identification score to an affirmative value if a first textual message of the ordered and numbered third query results is in the conversation listing after a textual message of the ordered and numbered fourth query results within a predetermined number of textual messages; and
   setting the minor age exchange identification score to a non-affirmative value if the minor age exchange identification score was not set to the affirmative value.

6. The computing device of claim 2, wherein said modifying the suspect textual score according to the estimated age imbalance score to generate a conversation risk score for the suspect-to-potential victim pair further comprises:
   counting textual messages sent between the suspect and the potential victim that included an image to generate a count; and
   scaling the conversation risk score if the count is greater than a predetermined factor.

7. The computing device of claim 3, the operations further including:

rounding down to a nearest integer each of the plurality of conversation risk scores to generate a plurality of rounded conversation risk scores; and ranking the plurality of conversation risk scores by sorting at least one of the rounded conversation risk scores, combinations of the estimated minor scores for each suspect-to-potential victim pair, or the plurality of conversation risk scores.

8. A method, comprising:

querying a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and determining a plurality of conversation risk scores based at least on the scored textual messages, each conversation risk score indicating an estimate of a risk of predatory behavior occurring during the corresponding conversation.

9. The method of claim 8, wherein said determining comprises:

generating a conversation risk score for each suspect-to-potential victim pair by analyzing textual messages of the corresponding conversation, including:

selecting a highest score for the scored textual messages of the corresponding conversation for each set of the plurality of sets of key phrases having a score to generate one or more highest scores, discarding the suspect-to-potential victim pair if the one or more highest scores includes fewer than a predetermined number of highest scores, combining the one or more highest scores to generate an average suspect key phrases score, multiplying the average suspect key phrases score by a group count ID to generate a suspect textual score, generating an estimated age imbalance score, and modifying the suspect textual score according to the estimated age imbalance score to generate a conversation risk score for the suspect-to-potential victim pair.

10. The method of claim 9, wherein said generating an estimated age imbalance score comprises:

generating an estimated minor age that indicates an age status of the potential victim;

generating an estimated adult age that indicates an age status of the suspect; and comparing the estimated minor age to the estimated adult age to determine the estimated age imbalance score.

11. The method of claim 10, wherein said generating an estimated minor age that indicates an age status of the potential victim comprises:

performing a loop for queries used in identification of a minor, the loop including:

querying textual messages of the plurality of textual messages sent by the potential victim for one or more terms indicating self-identification of an age of the potential victim to generate first query results, determining a minor age self-identification score based on the first query results, querying textual messages of the plurality of textual messages sent by the suspect for one or more terms indicating identification of an age of the potential victim to generate second query results, determining a minor partner age identification score based on the second query results, querying textual messages of the plurality of textual messages sent by the suspect for an indication of a request for an age of the potential victim to generate third query results, querying textual messages of the plurality of textual messages sent by the potential victim for an indication of a response to the request for the age of the potential victim to generate fourth query results, and determining a minor age exchange identification score based on the third and fourth query results; and performing the loop for queries used in identification of an adult, to determine an adult age self-identification score, an adult age partner identification score, and an adult age exchange identification score;

combining the minor age self-identification score, the minor partner age identification score, and the minor age exchange identification score to generate the estimated minor score;

combining the adult age self-identification score, the adult age partner identification score, and the adult age exchange identification score to generate the estimated adult score; and comparing the estimated minor score to the estimated adult score to determine the estimated minor age.

12. The method of claim 11, wherein said determining a minor age exchange identification score based on the third and fourth query results comprises:

ordering chronologically and numbering the textual messages in the third query results in a conversation listing;

ordering chronologically and numbering the textual messages in the fourth query results in the conversation listing;

setting the minor age exchange identification score to an affirmative value if a first textual message of the ordered and numbered third query results is in the conversation listing after a textual message of the ordered and numbered fourth query results within a predetermined number of textual messages; and setting the minor age exchange identification score to a non-affirmative value if the minor age exchange identification score was not set to the affirmative value.

13. The method of claim 9, wherein said modifying the suspect textual score according to the estimated age imbalance score to generate a conversation risk score for the suspect-to-potential victim pair further comprises:

counting textual messages sent between the suspect and the potential victim that included an image to generate a count; and scaling the conversation risk score if the count is greater than a predetermined factor.

14. The method of claim 10, the method further comprising:

rounding down to a nearest integer each of the plurality of conversation risk scores to generate a plurality of rounded conversation risk scores; and ranking the plurality of conversation risk scores by sorting at least one of the rounded conversation risk scores, combinations of the estimated minor scores for each suspect-to-potential victim pair, or the plurality of conversation risk scores.

15. A system implemented in at least one computing device, comprising:

a query engine implemented by at least one processor circuit to query a plurality of textual messages of a message repository with a plurality of sets of key phrases to determine and score textual messages that include one or more of the key phrases of the sets, each scored textual message including a suspect, a potential victim, and a score, each suspect-to-potential victim pair corresponding to a conversation that includes the scored textual messages between the suspect and potential victim of the pair; and a conversation risk determiner implemented by the at least one processor circuit to determine a plurality of conversation risk scores based at least on the scored textual messages, each conversation risk score indicating an estimate of a risk of predatory behavior occurring during the corresponding conversation.

16. The system of claim 15, wherein to determine a conversation risk score for each conversation corresponding to a suspect-to-potential victim pair, the conversation risk determiner is configured to select a highest score for the scored textual messages of the corresponding conversation for each set of the plurality of sets of key phrases having a score to generate one or more highest scores;

discard the suspect-to-potential victim pair if the one or more highest scores includes fewer than a predetermined number of highest scores;

combine the one or more highest scores to generate an average suspect key phrases score;

multiply the average suspect key phrases score by a group count ID to generate a suspect textual score;

generate an estimated age imbalance score; and modify the suspect textual score according to the estimated age imbalance score to generate a conversation risk score for the suspect-to-potential victim pair.

17. The system of claim 16, wherein to generate an estimated age imbalance score, the conversation risk determiner is configured to:

generate an estimated minor age that indicates an age status of the potential victim;

generate an estimated adult age that indicates an age status of the suspect; and compare the estimated minor age to the estimated adult age to determine the estimated age imbalance score.

18. The system of claim 17, wherein to generate an estimated minor age that indicates an age status of the potential victim, the system performs a loop for queries used in identification of a minor;

in the loop, the query engine is configured to:

query textual messages of the plurality of textual messages sent by the potential victim for one or more terms indicating self-identification of an age of the potential victim to generate first query results, query textual messages of the plurality of textual messages sent by the suspect for one or more terms indicating identification of an age of the potential victim to generate second query results, query textual messages of the plurality of textual messages sent by the suspect for an indication of a request for an age of the potential victim to generate third query results, and query textual messages of the plurality of textual messages sent by the potential victim for an indication of a response to the request for the age of the potential victim to generate fourth query results;

in the loop, the conversation risk determiner is configured to:

determine a minor age self-identification score based on the first query results;

determine a minor partner age identification score based on the second query results; and determine a minor age exchange identification score based on the third and fourth query results;

the loop also performed by the system for queries used in identification of an adult, to determine an adult age self-identification score, an adult age partner identification score, and an adult age exchange identification score; and the conversation risk determiner further configured to:

combine the minor age self-identification score, the minor partner age identification score, and the minor age exchange identification score to generate the estimated minor score, combine the adult age self-identification score, the adult age partner identification score, and the adult age exchange identification score to generate the estimated adult score, and compare the estimated minor score to the estimated adult score to determine the estimated minor age.

19. The system of claim 18, wherein to determine a minor age exchange identification score based on the third and fourth query results, the conversation risk determiner is configured to:

order chronologically and number the textual messages in the third query results in a conversation listing;

order chronologically and number the textual messages in the fourth query results in the conversation listing;

set the minor age exchange identification score to an affirmative value if a first textual message of the ordered and numbered third query results is in the conversation listing after a textual message of the ordered and numbered fourth query results within a predetermined number of textual messages; and set the minor age exchange identification score to a non-affirmative value if the minor age exchange identification score was not set to the affirmative value.

20. The system of claim 16, further comprising:

a conversation ranker configured to round down to a nearest integer each of the plurality of conversation risk scores to generate a plurality of rounded conversation risk scores, and rank the plurality of conversation risk scores by sorting at least one of the rounded conversation risk scores, combinations of the estimated minor scores for each suspect-to-potential victim pair, or the plurality of conversation risk scores.

* * * * *